(12) United States Patent
Caulfield et al.

(10) Patent No.: US 12,075,185 B2
(45) Date of Patent: Aug. 27, 2024

(54) FAST FRAMING MOVING TARGET IMAGING SYSTEM AND METHOD

(71) Applicant: Cyan Systems, Santa Barbara, CA (US)

(72) Inventors: John Caulfield, Santa Barbara, CA (US); Jon Paul Curzan, Arroyo Grande, CA (US)

(73) Assignee: Cyan Systems, Santa Barbara, CA (US)

( * ) Notice: Subject to any disclaimer, the term of this patent is extended or adjusted under 35 U.S.C. 154(b) by 0 days.

(21) Appl. No.: 18/118,691

(22) Filed: Mar. 7, 2023

(65) Prior Publication Data

US 2024/0031521 A1    Jan. 25, 2024

Related U.S. Application Data

(63) Continuation of application No. 16/912,606, filed on Jun. 25, 2020, now Pat. No. 11,637,972.

(Continued)

(51) Int. Cl.
*H04N 5/33* (2023.01)
*G06T 7/246* (2017.01)
(Continued)

(52) U.S. Cl.
CPC ............. *H04N 5/33* (2013.01); *G06T 7/248* (2017.01); *G06V 10/255* (2022.01); *H04N 25/53* (2023.01);
(Continued)

(58) Field of Classification Search
CPC ........ H04N 23/55; H04N 23/61; H04N 23/66; H04N 23/667; H04N 23/69; H04N 23/695;
(Continued)

(56) References Cited

U.S. PATENT DOCUMENTS

| 3,699,341 A | 10/1972 | Quillinan |
| 3,936,822 A | 2/1976 | Hirschberg |

(Continued)

FOREIGN PATENT DOCUMENTS

| CN | 101574567 | 8/2011 |
| CN | 102486709 | 6/2012 |

(Continued)

OTHER PUBLICATIONS

Allison Barrie, Sniper Detectors Coming to America's Heartland, FOX Firepower, Dec. 22, 2011.

(Continued)

*Primary Examiner* — Yogesh K Aggarwal
(74) *Attorney, Agent, or Firm* — Van Pelt, Yi & James LLP

(57) ABSTRACT

A method that can detect targets is described. The method includes setting an integration time for each of a plurality of readout circuits based on a speed of the target. The readout circuits are configured to read pixels in an image detector. The pixels have a pitch of less than ten micrometers. The integration time is not more than five hundred microseconds and corresponds to a subframe of a fast frame image. The method also includes performing integrations of each readout circuit based on the integration time. Thus, a plurality of subframes are provided. A number of the subframes are averaged to provide the fast frame image.

17 Claims, 12 Drawing Sheets

Related U.S. Application Data

(60) Provisional application No. 62/868,445, filed on Jun. 28, 2019.

(51) Int. Cl.
*G06V 10/20* (2022.01)
*H04N 25/53* (2023.01)
*H04N 25/533* (2023.01)
*H04N 25/587* (2023.01)
*H04N 25/75* (2023.01)

(52) U.S. Cl.
CPC ......... *H04N 25/533* (2023.01); *H04N 25/587* (2023.01); *H04N 25/75* (2023.01); *G06T 2207/10048* (2013.01); *G06T 2207/20212* (2013.01)

(58) Field of Classification Search
CPC .......... H04N 7/18; H04N 23/45; H04N 23/67; G02B 5/0883; G02B 7/102; G02B 26/0816; G02B 13/0065; G02F 1/163; G03B 19/12; G03B 5/00; G03B 17/17; G03B 2205/0046
See application file for complete search history.

(56) References Cited

U.S. PATENT DOCUMENTS

| | | |
|---|---|---|
| 4,684,812 A | 8/1987 | Tew |
| 4,779,004 A | 10/1988 | Tew |
| 4,780,719 A | 10/1988 | Frei |
| 4,917,490 A | 4/1990 | Schaffer, Jr. |
| 5,196,689 A | 3/1993 | Sugita |
| 5,246,868 A | 9/1993 | Busch |
| 5,473,162 A | 12/1995 | Busch |
| 5,504,717 A | 4/1996 | Sharkey |
| 5,596,509 A | 1/1997 | Karr |
| 5,612,676 A | 3/1997 | Plimpton |
| 5,629,522 A | 5/1997 | Martin |
| 5,703,835 A | 12/1997 | Sharkey |
| 5,796,474 A | 8/1998 | Squire |
| 5,973,998 A | 10/1999 | Showen |
| 6,178,141 B1 | 1/2001 | Duckworth |
| 6,357,158 B1 | 3/2002 | Smith, III |
| 6,449,540 B1 | 9/2002 | Rayner |
| 6,496,593 B1 | 12/2002 | Krone, Jr. |
| 6,819,495 B2 | 11/2004 | Shani |
| 6,840,342 B1 | 1/2005 | Hahn |
| 6,847,587 B2 | 1/2005 | Patterson |
| 6,965,541 B2 | 11/2005 | Lapin |
| 6,985,337 B2 | 1/2006 | Dieny |
| 7,114,846 B2 | 10/2006 | Tominaga |
| 7,139,222 B1 | 11/2006 | Baxter |
| 7,266,045 B2 | 9/2007 | Baxter |
| 7,409,899 B1 | 8/2008 | Beekman |
| 7,411,865 B2 | 8/2008 | Calhoun |
| 7,420,878 B2 | 9/2008 | Holmes |
| 7,423,272 B2 | 9/2008 | Hasegawa |
| 7,474,589 B2 | 1/2009 | Showen |
| 7,532,542 B2 | 5/2009 | Baxter |
| 7,551,059 B2 | 6/2009 | Farrier |
| 7,586,812 B2 | 9/2009 | Baxter |
| 7,599,252 B2 | 10/2009 | Showen |
| 7,602,329 B2 | 10/2009 | Manderville |
| 7,646,419 B2 | 1/2010 | Cernasov |
| 7,688,679 B2 | 3/2010 | Baxter |
| 7,696,919 B2 | 4/2010 | Moraites |
| 7,710,278 B2 | 5/2010 | Holmes |
| 7,719,428 B2 | 5/2010 | Fisher |
| 7,732,771 B2 | 6/2010 | Hasegawa |
| 7,750,814 B2 | 7/2010 | Fisher |
| 7,751,282 B2 | 7/2010 | Holmes |
| 7,755,495 B2 | 7/2010 | Baxter |
| 7,796,470 B1 | 9/2010 | Lauder |
| 7,855,935 B1 | 12/2010 | Lauder |
| 7,947,954 B2 | 5/2011 | Snider |
| 7,961,550 B2 | 6/2011 | Calhoun |
| 8,036,065 B2 | 10/2011 | Baxter |
| 8,049,659 B1 | 11/2011 | Sullivan |
| 8,063,773 B2 | 11/2011 | Fisher |
| 8,111,289 B2 | 2/2012 | Zruya |
| 8,134,889 B1 | 3/2012 | Showen |
| 8,170,731 B2 | 5/2012 | Martinez |
| 8,212,210 B2 | 7/2012 | Hargel |
| 8,325,563 B2 | 12/2012 | Calhoun |
| 8,334,770 B2 | 12/2012 | Gurton |
| 8,351,297 B2 | 1/2013 | Lauder |
| 8,369,184 B2 | 2/2013 | Calhoun |
| 8,421,015 B1 | 4/2013 | Scott |
| 8,483,567 B2 | 7/2013 | Armentrout |
| 8,748,816 B2 | 6/2014 | Kooijman |
| 8,809,787 B2 | 8/2014 | Tidhar |
| 8,825,562 B2 | 9/2014 | Walker |
| 8,868,288 B2 | 10/2014 | Plante |
| 8,880,279 B2 | 11/2014 | Plante |
| 8,892,310 B1 | 11/2014 | Palmer |
| 8,904,689 B2 | 12/2014 | Kountotsis |
| 8,955,421 B1 | 2/2015 | Kountotsis |
| 8,970,706 B2 | 3/2015 | Scott |
| 8,981,989 B2 | 3/2015 | Gould |
| 8,989,959 B2 | 3/2015 | Plante |
| 8,995,227 B1 | 3/2015 | Johnson |
| 8,996,240 B2 | 3/2015 | Plante |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,234,963 B2 | 1/2016 | Rakeman |
| 9,294,690 B1 | 3/2016 | Caulfield |
| 9,402,060 B2 | 7/2016 | Plante |
| 9,472,029 B2 | 10/2016 | Plante |
| 9,488,442 B2 | 11/2016 | Varga |
| 9,501,878 B2 | 11/2016 | Palmer |
| 9,545,881 B2 | 1/2017 | Plante |
| 9,554,080 B2 | 1/2017 | Plante |
| 9,566,910 B2 | 2/2017 | Plante |
| 9,594,371 B1 | 3/2017 | Palmer |
| 2003/0232297 A1 | 12/2003 | Pareek |
| 2004/0057121 A1 | 3/2004 | Shani |
| 2004/0208223 A1 | 10/2004 | Tominaga |
| 2005/0224716 A1 | 10/2005 | Armentrout |
| 2005/0285953 A1 | 12/2005 | Hasegawa |
| 2006/0049930 A1 | 3/2006 | Zruya |
| 2006/0078037 A1 | 4/2006 | Lee |
| 2006/0113458 A1 | 6/2006 | Yang |
| 2007/0040062 A1 | 2/2007 | Lau |
| 2007/0170359 A1 | 7/2007 | Syllaios |
| 2008/0106727 A1 | 5/2008 | Cernasov |
| 2008/0136626 A1 | 6/2008 | Hudson |
| 2008/0291075 A1 | 11/2008 | Rapanotti |
| 2009/0080700 A1 | 3/2009 | Lau |
| 2009/0121925 A1 | 5/2009 | Scott |
| 2009/0260511 A1 | 10/2009 | Melnychuk |
| 2009/0276110 A1 | 11/2009 | Martinez |
| 2009/0290019 A1 | 11/2009 | McNelis |
| 2009/0292467 A1 | 11/2009 | McNelis |
| 2009/0294666 A1 | 12/2009 | Hargel |
| 2009/0320348 A1 | 12/2009 | Kelly |
| 2010/0027840 A1 | 2/2010 | Roberts |
| 2010/0079280 A1 | 4/2010 | Lacaze |
| 2010/0182482 A1* | 7/2010 | Tanaka ................... H04N 25/48 348/333.12 |
| 2010/0208339 A1* | 8/2010 | Kleppe .................. G02B 21/06 359/385 |
| 2010/0226210 A1 | 9/2010 | Kordis |
| 2010/0245644 A1 | 9/2010 | Ellis-Monaghan |
| 2011/0025521 A1 | 2/2011 | Gurton |
| 2011/0095187 A1 | 4/2011 | Snider |
| 2011/0170798 A1 | 7/2011 | Tidhar |
| 2011/0261193 A1 | 10/2011 | Agurok |
| 2011/0315767 A1 | 12/2011 | Lowrance |
| 2013/0088594 A1 | 4/2013 | Wyles |
| 2013/0140433 A1 | 6/2013 | Oggier |

(56) References Cited

U.S. PATENT DOCUMENTS

| | | | |
|---|---|---|---|
| 2013/0308939 A1 | 11/2013 | Armentrout | |
| 2015/0192667 A1 | 7/2015 | Rakeman | |
| 2016/0232774 A1 | 8/2016 | Noland | |
| 2016/0313441 A1 | 10/2016 | Tuxen | |
| 2017/0123487 A1 | 5/2017 | Hazra | |
| 2017/0318238 A1* | 11/2017 | Sugiyama | H04N 25/50 |
| 2019/0064310 A1 | 2/2019 | Tsang | |
| 2019/0124264 A1* | 4/2019 | Kogure | G06T 1/0007 |
| 2019/0379852 A1 | 12/2019 | Akabori | |

FOREIGN PATENT DOCUMENTS

| | | |
|---|---|---|
| CN | 103091249 | 5/2013 |
| CN | 107077020 | 8/2017 |
| EP | 1122508 | 10/2005 |
| EP | 2533001 | 12/2012 |
| EP | 2911092 | 8/2015 |
| IL | 169836 | 11/2010 |
| JP | 2019216315 | 12/2019 |
| WO | 2000019052 | 4/2000 |
| WO | 2004008403 | 1/2004 |
| WO | 2005045380 | 5/2005 |
| WO | 2007088552 | 8/2007 |
| WO | 2007107988 | 9/2007 |
| WO | 2008060257 | 5/2008 |
| WO | 2009102310 | 8/2009 |
| WO | 2016142549 | 9/2016 |

OTHER PUBLICATIONS

Andrew White, Fighting Fire with Fire: Technology Finds a Solution to Sniper Attacks, Jane's International Defence Review, Jun. 2009, pp. 52-57.
Andy Nativi, AW I Countersniper Systems Detect Hidden Shooters, Defense & Aerospace News, News from the Defense & Aerospace Industry, Dec. 22, 2011, pp. 1-3.
Arnold Goldberg, Infrared Signatures of the Muzzle Flash of a 120mm Tank Gun and their Implications for the Kinetic Energy Active Protection System (KEAPS), Army Research Laboratory, ARL-TR-909, Oct. 2001.
Asfaw et al., Impact of Pose and Glasses on Face Detection Using the Red Eye Effect, Mar. 2003.
Associated Press, Infrared Detects Sniper Gunfire, Wired, Associated Press, Science, Oct. 29, 2005.
Author Unknown, Infantry: Sniper Detectors Arrive, Aug. 22, 2009, Strategy World.
Author Unknown, SLD500 Sniper Locator, May 11, 2006.
Brown et al., Ku-Band Retrodirective Radar for Ballistic Projectile Detection and Tracking, IEEE, 2009, pp. 1-4.
Callan et al., Sensors to Support the Soldier, Feb. 3, 2005, pp. 1-101.
Caulfield et al., Small Pixel Infrared Sensor Technology, Proceedings of SPIE 10177, Infrared Technology and Applications XLIII, 1017725 (May 3, 2017).
Chris Hughes, British Troops to get iPod-Sized "Sniper Finders" to take on Deadly Sharpshooters in Afghanistan, Mar. 8, 2011.
David Crane, Anti-Sniper/Sniper Detection/Gunfire Detection Systems at a Glance, Defensereview.com, Jul. 19, 2006.
David Crane, Torrey Pines Logic Mirage—1200 and Myth-350 Handheld Sniper Detection Systems, Defensereview.com, Dec. 8, 2008.
Douglas et al., The Objective Force Soldier/Soldier Team, Army Science Board, FY2001 Summer Study, Final Report, vol. II The Science and Technology Challenges, Nov. 2001.
Duckworth et al., Fixed and Wearable Acoustic Counter-Sniper Systems for Law Enforcement, SPIE Conference on Sensors, C31, Information, and Training Technologies for Law Enforcement, Boston MA, Nov. 1998.
Ertem et al., An Acoustic Sensor for the Viper Infrared Sniper Detection System, Aug. 1999.
Francis Flinch, Wikipedia, User Talk: Francis Flinch, Apr. 10, 2019, p. 1-32.
IRobot, Combat-Proven Robot to be Equipped with Enhanced Laser, Optical & Acoustic Systems, iRobot and Boston Univ. Photonics Center Unveil Advanced Sniper Detection System for iRobot PackBot, Oct. 3, 2005.
John Keller, Sniper-Detection Systems to Provide Perimeter Security for Army Forces in Afghanistan to come from Raytheon BBN, Feb. 15, 2011.
Law et al., Multi-Spectral Signature Analysis Measurements of Selected Sniper Rifles and Small Arms, Proc. SPIE 2938, Command, Control, Communications, and Intelligence Systems for Law Enforcement, (Feb. 18, 1997), pp. 288-298.
Li et al., Real-Time Tracking of Bullet Trajectory Based on Chirp Transform in a Multi-Sensor Multi-Frequency Radar, Center for Advanced Communications, Villanova University, IEEE 2010, pp. 1203-1207.
Michael Naimark, How to Zap a Camera: Using Lasers to Temporarily Neutralize Camera Sensors, Camera Zapper, Oct. 2002.
Moroz et al., Airborne Deployment of and Recent Improvements to the Viper Counter Sniper System, 1999, Naval Research Laboratory.
Nigel F. Evans, British Artillery Fire Control Ballistics & Data, Apr. 28, 2014.
Noah Shachtman, Lasers Stop Snipers Before They Fire (updated), Apr. 26, 2007.
Peter A. Buxbaum, Pinpointing Sniper Perches, Aug. 2010, Sotech 8.6, pp. 11-14.
Rafael, Anti-Sniper Systems Finding Their Range, Defense Industry Daily, Nov. 3, 2005.
Robert D. Fiete, Image Quality and $\lambda FN/p$ for Remote Sensing Systems, Opt. Eng. 38 (7), pp. 1229-1240, (1999).
Scanlon et al., Networked Acoustic Sensor Array's Performance During 2004 Horizontal Fusion—Warrior's Edge Demonstration, Dec. 2004, US Army Research Laboratory, pp. 1-8.
Simon et al., Sensor Network-Based Countersniper System, SenSys'04, Nov. 3-5, 2004.
Simonis et al., Nanotechnology, Innovation Opportunities for Tomorrow's Defence, TNO Science & Industries, Mar. 2006.
Tim Hornyak, U.S. Troops Getting Wearable Gunshot Detectors, a Shoulder-Mounted Unit with Four Acoustic Sensors and a Chest Display that Attaches to Body Armor can Show the Direction and Distance of Sniper Fire in a Fraction of a Second, Mar. 21, 2011.
Tina Cipara, Using Radar Signals to Safegauard our Troops, Mason Research, Mar. 15, 2011.
Tom Vanden Brook, High-Tech Device Helps U.S. Troops Pinpoint Snipers, USA Today, Mar. 2, 2011.
Torrey Pines Logic, Product Release, New Mini Thermal Zoom Imagers from Torrey Pines Logic—The New T12 is Small Enough for a Pistol with all the Features of Larger More Expensive Imagers, Nov. 3, 2015.
W.E. Tennant, "Rule 07" Revisited: Still a Good Heuristic Predictor of p/n HgCdTe Photodiode Performance?, Journal of Electronic Materials, vol. 39, No. 7, 2010.
Wikipedia, External Ballistics, Dec. 2, 2018.
Wikipedia, External Ballistics, Jan. 31, 2012.
Wikipedia, Talk: External Ballistics, Jun. 5, 2015.
Zhang et al., Real-Time Acquisition and Tracking of Sniper Bullets using Multi-Sensor Multi-Frequency Radar Techniques, Center for Advanced Communications, Villanova University, IEEE, 2009, pp. 265-268.

* cited by examiner

FAST FRAMING MOVING TARGET IMAGING SYSTEM AND METHOD

CROSS REFERENCE TO OTHER APPLICATIONS

This application is a continuation of U.S. patent application Ser. No. 16/912,606 entitled FAST FRAMING MOVING TARGET IMAGING SYSTEM AND METHOD filed Jun. 25, 2020, which claims priority to U.S. Provisional Patent Application No. 62/868,445 entitled FAST FRAMING MOVING TARGET IMAGING SENSOR filed Jun. 28, 2019, both of which are incorporated herein by reference for all purposes.

GOVERNMENT SUPPORT

This invention was made with support under contract FA8651-19-C-0021 awarded by the Airforce Research Laboratory. The government has certain rights in the invention.

BACKGROUND OF THE INVENTION

Existing optical and acoustic techniques for detecting fast moving targets, such as projectiles resulting from hostile fire, have significant drawbacks. Acoustic detection methods typically use numerous audio sensors with precise relative alignment and complex processing. Acoustic detection methods may also require close proximity to a shooter (for detection of the audible muzzle blast) or the projectile (for detection of a shockwave). In addition to being short range, acoustic detection methods also suffer from having multipath solutions, poor directionality and false positives due to similar sounds. Acoustic methods also typically require humans-in-the-loop to assist in discriminating false signatures. Existing imaging detection methods attempting to detect the projectiles (e.g. bullets) may be unable to resolve such small, relatively dim targets moving at high speed. As a result, optical detection methods typically use a muzzle flash or similar mechanism for detection. Such detection methods require the shooter to be in line of sight of the sensor, not using flash suppression on the firearm, and relatively close. Thus, an improved mechanism for detecting fast moving targets is desired.

BRIEF DESCRIPTION OF THE DRAWINGS

Various embodiments of the invention are disclosed in the following detailed description and the accompanying drawings.

DETAILED DESCRIPTION

Figure 1:
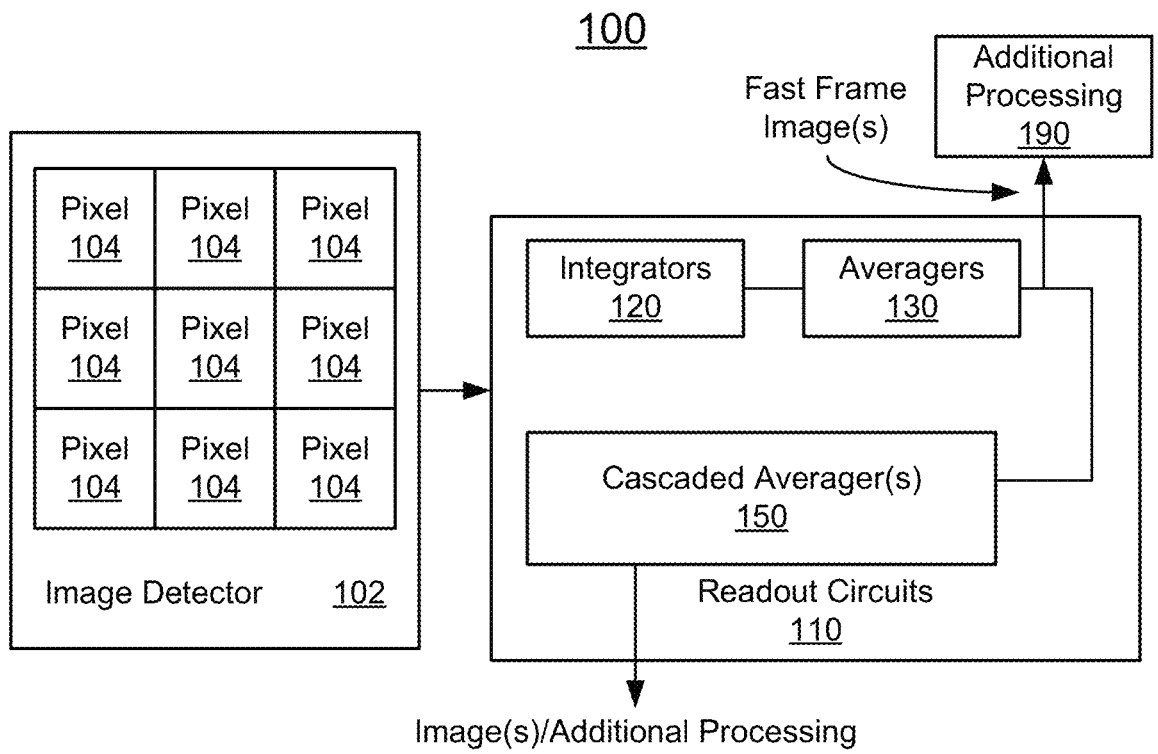
FIG. 1 is a block diagram depicting an embodiment of a system configured to detect moving targets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Optical and acoustic methods for detecting fast moving projectiles resulting from hostile fire and other moving targets have significant drawbacks. Acoustic detection methods are complex, may require humans in-the-loop, and may require that either the target or its source (e.g. a shooter) be relatively close for detection. Existing optical detection methods utilize image sensors that have been developed to maximize the noise equivalent differential temperature (NEDT), which is a measure of sensor performance. Such sensors typically have a pixel pitch on the order of 12-60 micrometers. Readout circuits for such image sensors typically utilize integration capacitors having a large well size and long (e.g. in the millisecond regime or larger) integration times. Thus, optical detection methods using such image detection systems are typically unable to discriminate types of objects desired to be detected (e.g. targets) that may be dim, small, fast moving or relatively distant. Consequently, an improved mechanism for detecting fast moving targets is desired.

A method and system that can detect targets are described. The method includes setting an integration time for each of a plurality of readout circuits based on a speed of the target. The readout circuits are configured to read pixels in an image detector. The pixels have a pitch of less than ten micrometers. The integration time is not more than five hundred microseconds and corresponds to a subframe of a fast frame image. In some embodiments, the integration time is at least twenty microseconds. In some embodiments, the integration time is at least one hundred microseconds and not more than three hundred microseconds. The method also includes performing integrations of each readout circuit integration and averaging stage based on the integration time. Thus, subframes are provided. A number of the subframes are averaged to provide the fast frame image. In some embodiments, the number of subframes that are averaged is at least five and not more than twenty. The target is resolvable in the fast frame image.

In some embodiments, the integration time is set to equal to five multiplied by a dwell time. The dwell time is the time which the target is expected to take to transit a pixel. Thus, the integration time may be not more than five multiplied by the pitch of the pixels divided by the speed of the target. In some embodiments, the integration time is not more than the dwell time. For example, in some embodiments, the integration is less than the dwell time, which reduces smear.

In some embodiments the integration performing and averaging are repeated for a plurality of iterations. Thus, a plurality of fast frame images can be provided. A combined frame including the fast frame image and the plurality of fast frame images can be summed. In some embodiments, fast frame images are integrated to provide an integrated fast frame image. An additional number of integrated fast frame images are averaged to provide an image frame which may improve the signal to noise ratio.

In some embodiments, the image detector is an infrared image detector. The pitch of the pixels of such an infrared image detector is not more than eight micrometers in some embodiments. In some embodiments, the pitch is not more than six micrometers. For example, the pitch may be at least one micrometer and not more than five micrometers. In some embodiments, the pitch is at least four micrometers and not more than six micrometers.

In some embodiments, the fast frame image provided includes a plurality of target-like features. At least one of the target-like features corresponds to the target. In order to detect the target, image features are filtered to exclude a portion of the plurality of target-like features inconsistent with a plurality of target thresholds. The target-like features are pre-processed to provide continuous target-like features. The continuous target-like features may be statistically analyzed based on their geometry. One or more of the continuous target-like features are removed from consideration based on size, shape and/or distance. Thus, target candidates are provided. The integration performing and averaging may be repeated for multiple iterations to provide a plurality of fast frame images. The filtering, preprocessing, statistically analyzing and removing may be repeated for the plurality of fast frame images to provide an additional plurality of target candidates for each of the plurality of fast frame images. The plurality of target candidates for the fast frame image and the additional plurality of target candidates for the each of the plurality of fast frame images may be compared to identify a target signature based on distance between the plurality of target candidates and each of the additional plurality of target candidates. Thus, target(s) may be detected based on the target signature(s).

In some embodiments, the system includes readout circuits coupled with the image detector. The integrating and averaging may be performed by the readout circuits, which are configured to read the pixels in the image detector. Thus, the integration time is set for these readout circuits. Each readout circuit includes an integrator and an averager coupled to the integrator. The integrator is configured to perform integrations based on the integration time. Thus, the integrator provides the subframes. The averager is configured to average the number of the subframes to provide the fast frame image. The target is resolvable in the fast frame image. The readout circuits may also include at least one cascaded averager for each pixel in the imager array. The cascaded averager provides additional signal integration. Thus, multiple integrations and averages may be performed in series (e.g. in a cascade) by the readout circuit. In some embodiments, a combiner that is configured to provide the combined frame including multiple fast frame images is also present. The combiner/averager may be provided in hardware and/or software. In some embodiments, the readout circuits are configured to retain a memory over at least a portion of the plurality of subframes.

In some embodiments, the system includes a processor and a memory. The memory provides the processor with instructions. The processor is configured to filter image features to exclude a portion of the plurality of target-like features inconsistent with a plurality of target thresholds. The processor is also configured to preprocess the target-like features to provide a plurality of continuous target-like features; statistically analyze the continuous target-like features based on their geometry; and remove a portion of the plurality of continuous target-like features based on at least one of size, shape and distance to provide a plurality of target candidates. The processor may be configured to perform these tasks for multiple fast frame images. The processor may also compare the target candidates for the fast frame image and the target candidates for the each of the plurality of fast frame images to identify a target signature based on distance between the target candidates.

Thus, fast frame images in which the target(s) are resolvable may be provided from an image detector having a pixel pitch of less than ten micrometers using short integration times. In some embodiments, the fast frame images in which the target(s) are resolvable may be provided from an image detector having a pixel pitch of not more than six micrometers (e.g. 4-6 micrometers or less and 5 micrometers in some embodiments) and using short integration times. As a result, small, fast moving target(s) may not transit a pixel in the integration time. This allows for the use of pixels in which the target occupies a larger fraction of the pixel and for reduced blur of the target. In some embodiments, higher contrast, higher gain, reduced target smear, and/or a larger detection range may be achieved. For example, bullets, supersonic targets and/or hypersonic targets may be detected and resolvable in fast frame images at large distances. Consequently, detection of small fast moving targets may be facilitated.

FIG. 1 is a block diagram depicting an embodiment of infrared (IR) detection system 100 configured to optically detect fast moving targets. Targets are the types of objects desired to be detected. Targets have speeds in characteristic or expected ranges, or have an expected or characteristic maximum speed. Examples of targets include bullets (and analogous fast moving projectiles), hypersonic projectiles, hypersonic vehicles, supersonic projectiles and/or supersonic vehicles. IR detection system 100 includes readout circuits 110 and optional additional processing block(s) 190. Readout circuits 110 are configured to read image detector 102. In some embodiments, image detector 102 is an infrared (IR) detector including an array of pixels 104. Image detector 102 may be a low band gap IR detector. In some embodiments, image detector 102 may be another type of detector.

In some embodiments, optics (not shown) are coupled with image detector 102. The optics focus light (e.g. IR radiation) onto one or more pixels 104. For example, the optics may include a fast lens that can increase the flux density of light onto the smaller pixels 104. Such a lens may also increase the lens acceptance apertures for a given focal length, which increases the solid angle for a given pixel 104. Thus, more light may be intercepted by pixels 104.

Pixels 104 function as photodiodes and may be aligned with connections to readout circuit 110. In some embodiments, pixels 104 have the same size. Thus, image detector 102 has a constant pitch. In some embodiments, pixels 104 are substantially square. In other embodiments, pixels 104 may have different sizes and/or other shapes. Pixels 104 are also desired to be small. For example, image detector 104 may has a pixel pitch of less than ten micrometers (e.g. pixels 104 being smaller than 10 µm×10 µm). In some embodiments, pixels 104 may have a pitch of not more than eight micrometers ((e.g. pixels 104 being smaller than 8×8 µm). In some embodiments, image detector 102 may have a pixel pitch of not more than six micrometers (e.g. 4-6 µm). For example, pixels 104 may have a pitch of five micrometers or less (e.g. pixels 104 being 5 µm×5 µm or smaller). In some embodiments, detector 102 may have a pixel pitch of not more than three micrometers. Thus, pixels 104 are small in size. The number of pixels in the array of detector 102 may be large. Other numbers, aspect ratios, numbers or pixels and/or other geometries are possible. The pixels 104 in the array of image detector 102 may be read out and processed in a raster scan.

Readout circuits 110 include integrators 120, averagers 130 and, in some embodiments, cascaded averager(s) 150. Cascaded averager(s) 150 include additional integrators (not shown in FIG. 1). For example, capacitors 1254 and 1256 (described below with respect to FIG. 13) may provide additional integration and averaging in cascaded averager 10. In some embodiments, each of integrators 120 includes an integration circuit for a particular pixel 104. Similarly, each of averagers 130 may include an averaging circuit for a corresponding integrator 130 and, therefore, for a particular pixel 104. Integrators 120 are high gain integrators that have a settable integration time. The integration time is set based upon the speed(s) of the targets. Improvements in the design of the optics and the infrared focal plane array (IRFPA)/image detector 102 allow optimization of the integration time and system gain. Integrators 120 may have an integration time of not more than 1000 microseconds. In some embodiments, the integration time is not more than five hundred microseconds. The integration time may not exceed than three hundred microseconds. The integration time may be not more than two hundred microseconds. For example, the integration time is as low as one hundred microseconds or less. For example, integration times of at least twenty microseconds may be used in some embodiments. Other integration times are possible. In some embodiments, each of integrators 120 includes an integration capacitor. For example, integrators 120 may each include one or more integration capacitors analogous to integration capacitor 1232 (e.g. described below with respect to FIGS. 11B, 11D, 13 and 14). The integration capacitor in each of integrators 120 may have a capacitance such that a charge on an integration capacitor at the expiration of a time interval equal to the integration time (e.g. at least 100 microseconds and not more than 1000 microseconds) is near the mid-well capacity of the capacitor. In some embodiments, the integration times of integrators 120 are set by setting the timing of switches coupled with integrators 120 and/or selecting the capacitance of the integration capacitor(s) for integrators 120. In some embodiments, each of integrators 120 has an integration time that is separately settable. Thus, different integration times may be usable for different integrators 120 (and thus for different pixels). In some embodiments, the integration times of integrators 120 are set together. In such embodiments, integrators 120 may have the same integration time. Thus, integrators 120 may have shorter integration times and significantly higher gains. Each integration may be considered a subframe for a frame being processed. Thus, subframes are provided by the integrators 120 to the averagers 130.

Averagers 130 may each include an averaging capacitor having a capacitance that is larger than that of the integration capacitor. For example, averagers 130 may each include one or more averaging capacitors analogous to averaging capacitor 1240 (e.g. described below with respect to FIGS. 11B, 11D, 13 and 14). Each averager 130 is coupled with a particular integrator 120. For example, a signal (e.g. a subframe) may be provided from one of integrators 120 to a particular averager 130 in response to the expiration of a time interval equal to the integration time. This may be accomplished by the periodic closing (e.g. upon the expiration of the integration time) of a switch. Each of averagers 130 provides an averaged signal after multiple samplings of the corresponding one of integrators 120. The effect of multiple averages is that the current signal is weighted more that past averages, therefore a fading memory effect exists in the averaging circuits. The output of averagers 130 are fast frame images. Fast frame images are provided at a high frame rate (e.g. at a rate at which averagers 130 are sampled). For example, such a fast frame rate may meet or exceed 500 frames per second. In some embodiments, fast frame rates are at least 1000 frames per second. Integration times for integrators 120 are set such that moving targets (e.g. types of objects desired to be detected and having speeds in characteristic ranges such as bullets, hypersonic projectiles/vehicles and supersonic projectiles/vehicles) are resolvable. Further, data for pixels 104, and thus for fast frame images, may be read out in a raster scan. Thus, the output of different averagers 120 is sampled over time to provide the fast frame images.

Readout circuits 110 also include one or more cascaded averagers 150 coupled to averagers 130. Cascaded averager(s) 150 provide additional integration and averaging of the signal from detector 102. More specifically, cascaded averagers 150 are coupled to corresponding averagers 140. In some embodiments, cascaded averagers 150 each includes at least one pair of capacitors arranged in a manner analogous to integrators 120 and averagers 130. In some embodiments, cascaded averagers may be viewed as performing additional integration(s) and average(s) on fast frame image data. Thus, images that are integrated, averaged fast frames may be output by cascaded averagers 150.

IR detection system 100 may also include additional processing block(s) 190. Additional processing block(s) 190 may include a combiner or other mechanism for adding multiple fast frame images to provide a combined, or stacked, image. In some embodiments, additional processing block(s) 190 include processor(s) and memory that are used to process fast frame image data and/or detect targets. For example, the fast frame image may include target-like features, at least some of which may be targets. These target-like features may be irregularly shaped. For example, a small target such as a bullet traveling at high speed may not have a readily recognizable shape in the fast frame images. Consequently, processing and analysis of the fast frame images is performed by additional processing block(s) 190. In order to detect the targets, image features are filtered to exclude a portion of the plurality of target-like features inconsistent with a plurality of target thresholds. For example, target-like features that are too large to be targets (e.g. bullets) based on the background or that are too far away (e.g. based on a comparison of background structures in the fast frame image) are removed. The remaining target-like features may also under pre-processing. Pre-processing may fill holes in the target-like features to provide continuous target-like features (continuous target-like features). The continuous target-like features are statistically analyzed based on their geometry. For example, the size, shape and distance to each continuous target-like feature may be statistically determined. One or more of the continuous target-like features may be removed from consideration based on their geometry. For example, even though a target-like feature was initially within the threshold for a target, further analysis may indicate that the shape of the continuous target-like features does not sufficiently match that of a projectile. Such continuous target-like features are removed from consideration. The remaining continuous target-like features in a fast frame image are target candidates. The target candidates for multiple fast frame images may be compared to identify a target signature. For example, the distance between a set of target candidates indicates the speed of the target candidates. If this speed is consistent with that of a projectile desired to be detected, the set of target candidates correspond to a target signature. If the distance between a second set of target candidates is zero and the size of the target candidates does not change, this indicates that the second set of target candidates correspond to an object that does not move. These target candidates to not correspond to a target signature. Instead, such target candidates may be a fixed object. Advanced detection and ID may use AI or Machine Learning based algorithms. Thus, target(s) may be detected based on the target signature(s).

IR detection system 100 may be usable in detecting small, dim, distant and/or fast moving targets. In particular, image detector 102 may include smaller pixels (e.g. less than ten micrometers and five micrometers or less in some embodiments). Consequently, benefits such as improved resolution and reduced noise equivalent power (NEP) may be achieved. Use of the fast lens described above may also increase the flux density per pixel and increase the solid angle of photosignal intercepted per pixel. Further, IR detection system 100 may address issues resulting from the use of smaller pixels 104. Integrators 120, averagers 130, and cascaded averagers 150, may mitigate the low etendue, or light collection efficiency, of small pixels 104. Readout circuits 110 may have circuit components allowing for increased gain for small pixels 104 while using successive signal averaging stages, such as averager 140 and cascaded averagers 150. Use of successive/cascaded averaging stages can reduce noise and increase effective charge storage capacity and hence improve noise equivalent power, signal to noise, and detectivity. Further, integration times for integrators 120 may be set to resolve small high speed targets. For example, reduced integration time may reduce the smear for the target. Multiple successive fast frame images may be captured such that the target appears sufficiently unsmeared in each fast frame image to be identified, determined to be moving and, therefore, detectable. Use of high gain in conjunction with the short integration time may also improve noise equivalent irradiance (NEI) of smaller pixels 104 when averaging is utilized. Fast frame images allow the signal for the target to be captured at the highest frame rates of a single fast frame (e.g. corresponding to averaging time), while increasing the effective well capacity of the imager, and decreasing the sensor noise through averaging by averager 130. Thus, small pixel high resolution image detectors 102 can be used detect fast moving dim objects. The dim objects can be sensed multiple times in multiple fast frames using a several hundred microseconds period at extremely long ranges. If IR detection system 100 (or at least image detector 102) is mounted on a moving platform, the use of fast frame images allows detection even if the apparent velocities of targets increase due to rotation or translation of the sensor platform.

IR detection system 100 addresses another possible issue in using short integration times: the ability to conduct normal single integrations by integrators 120 and averaging by averages 130 at a short integration times of ~200 microseconds so that IR image detection system 100 may function with reduced (and/or without) smearing in most scenarios. For example, hypersonic targets may be imaged with reduced or no smearing at distances of greater than one thousand kilometers from the image detector 102. With this short integration time, it takes 10 frames to reach a 2 millisecond integration time. Since the smear is a function of velocity and integration time, as the image detector 102 becomes closer to the desired target to be detected (or vice versa), smear may increase. However, in some embodiments, using variable integration times allows IR detection system 100 to have an integration period at any multiple of 200 μs to trade between fast motion and proximity. In some embodiments, smear can be defined as platform velocity*$T_{int}$/GSD (ground sample distance) of image detector 102 at a given height. In general for detection and targeting if the platform on which IR detection system 100 is mounted is moving, it is desirable for smear to be reduced to <20% of a pixel. For example, for pixels 104 having a pitch of five micrometers, a platform speed of 240 meters/sec and GSD with mm and a 50 mm focal length lens, it may be desirable to have an integration time of less than millisecond for lowest smear operation. As indicated above, such integration times are consistent with operation of IR detection system 100.

IR detection system 100 may also function at higher dark currents (Idark). Charge skimming of various types can be used to effectively subtract the excess dark current off of leaky detectors. Using the charge skimming to first selectively remove excess dark current prior to averager 130. Charge skimming is discussed below, with respect to the IR detection system of FIG. 13. This allows a signal to noise improvement factor that may be greater than nine. In ordinary single capacitor and single stage averagers, the full dark current induced shot noise is captured at the input capacitor. This high dark current noise is often greater than the photon shot noise from the image. In some embodiments, small pixel cascaded averager readout circuits 110 offer charge skimming capabilities that enable a higher dark current detector with precision charge skimming to provide signal to noise levels that meet or exceed that of a normal integrator. For example, with a dark current 50× the photo current, the additional dark current noise is ~7× over the photon random arrival noise. Averager 130 and cascaded averager 150 reduce the excess dark current noise to within a factor of 1-2 times of photosignal noise performance. The multiple stages of cascaded averagers may reduce the excess dark current noise further to near the noise of a non-leaky detector.

Thus, IR detection system 100 may reduce integration times, improve signal-to-noise, increase sensitivity, improve contrast, increase dynamic range, provide higher frame rates and improve imaging using smaller pixels 104. As a result, target detection, bullet trace back, detection of ultrasonic and hypersonic targets, detection of dim targets, improved resolution of distant targets, and detection of drones, hostile fire threats, detection of long range hypersonic vehicles and other small or large fast-moving objects, and/or other applications can be facilitated. For example the IR detection system 100 might use variable aperture optics for targets that remain in pixel for less than forty microseconds (e.g. have a dwell time of less than 40 μsec), and also tuned for high SNR for targets moving more slowly to provide reduced smearing with an integration time of five hundred microseconds or less. For slow moving targets, integration times on the order of forty to fifty milliseconds or less (e.g. 33 milliseconds sec in some embodiments) may provide reduced smearing for such targets. IR detection system 100 may thus be capable of detecting bullets (e.g. sized on the order of a less than ten centimeters) at distances from the sensor of less than one kilometer but greater than five hundred meters and/or capable of detecting hypersonic vehicles at distances of greater than 1000 kilometers (because of the heat and signature from a hypersonic vehicle). In some embodiments, detection of hypersonic vehicles at distances of 12000 kilometers may be achieved. In some embodiments, IR detection system 100 can detect all aspects of hostile fire, including muzzle flash, hot gas ejection, high resolution of the shooter and surrounds, and the bullet itself while the bullet is traveling a near the speed of sound. Further, averaging in IR detection system 100 helps with drift, 1/f noise, popcorn noise/blinkers, Thus, very high operating temperature (HOT) detectors can approach performance like that of their "cooler" running cryogenic cooled counterparts. In some embodiments, very HOT detectors may have built-in noise reduction and filtering capabilities in the readout circuits 110 that compensate for a high dark current ($I_{dark}$), variable quantum efficiency (QE), diffusion, and fill factor effects. It has been determined that at temperatures approaching 280 K using HOT midwave infrared (MWIR) sensors, adequate data may be collected from image detector 102 running at temperatures from ~150 K to 280 K.

Figure 2:
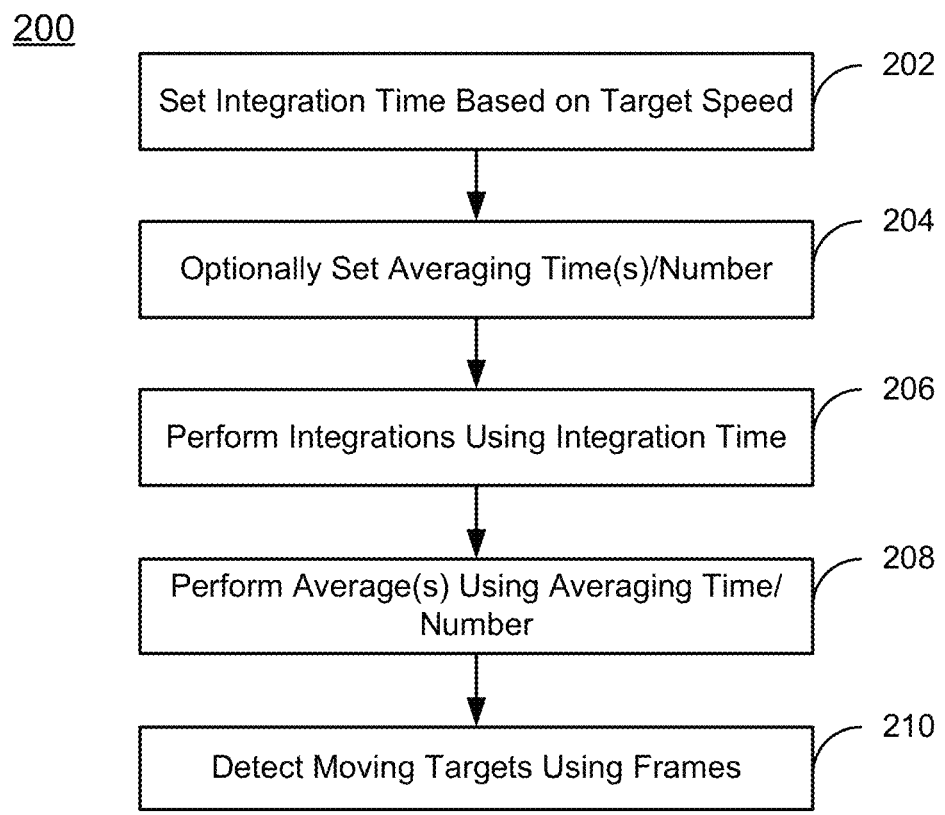
FIG. 2 is a flow chart depicting an embodiment of a method for detecting moving targets.

FIG. 2 depicts an embodiment of method 200 usable in detection of small, dim, distant and/or fast targets. Method 200 may be used with and is described in the context of IR detection system 100. Method 200 may include substeps. In addition, in some embodiments, steps and/or substeps may be performed in another order, including in parallel. Further, although described in the context of single pixel, method 200 may extended to multiple pixels in a detector array. For example, the pixels in the detector may be raster scanned or snapshot scanned allowing method 200 to be carried out for each pixel and the output used to provide a video readout or still image.

The integration time for each integrator coupled with each pixel of an infrared image detector is set based on the speeds of targets desired to be detected, at 202. In some embodiments, all of the integrators for all pixels are set to the same integration time. In some embodiments, integrators have different integration times. In some embodiments, 202 includes selecting the capacitances for the integration capacitors in the integrators. In some embodiments, 202 includes determining the timing of switches. For example, integration time may be set at least in part by selecting the timing of closing of a switch between an integrator and a corresponding averager (e.g. switch 1242 in FIGS. 11B, 11D, 13 and 14). In some embodiments, the integration time is set to be at or near the dwell time of the target in a pixel. In some embodiments, the integration time is set to be less than the dwell time of a target in a pixel. As discussed above, targets may have an expected, maximum, or characteristic speed. The dwell time is the time which the target is expected to take to transit a pixel based on the speed (e.g. expected speed(s), maximum speed or characteristic speed(s)). For an unmoving detection system, the speed is the speed of the target with respect to the earth. For a moving detection system, the speed is the speed of the target relative to the (moving) detection system. Thus, the dwell time of a target is the pixel dimension (e.g. width) divided by the speed of the target (e.g. the expected or maximum speed of the target). Since the pitch of the pixels is the same as the pixel dimension, the dwell time is also the pixel pitch divided by the target speed. In some embodiments, the integration time is set to not more than twenty multiplied by the pixel pitch divided by the target speed (twenty multiplied by the dwell time). In some embodiments, the integration time is not more than fifteen multiplied by the dwell time. The integration time may be not more than ten multiplied by the dwell time. In some embodiments, for example, the integration time may be set to not more than five multiplied by the pixel pitch divided by the target speed (five multiplied by the dwell time). In some embodiments, the integration time is not more than three multiplied by the pixel pitch divided by the target speed (three multiplied by the dwell time). In some embodiments, the integration time is not more than two multiplied by the pixel pitch divided by the target speed (two multiplied by the dwell time). In some such embodiments, the integration time is not more than the dwell time. Thus, the integration time may be less than the dwell time. In some embodiments, the integration time is at least one-half of the dwell time. Other integration times are possible.

The averaging time, or a number of averages of corresponding integrator(s), is set for each averager, at 204. In some embodiments, all of the averagers are set to the same averaging time. In some embodiments, averagers have different averaging times. In some embodiments, 204 includes selecting the capacitances for the averagers. The averaging time may be set at least in part by the timing of sampling of the averager.

In some embodiments, 202 and 204 may be performed at a different time and/or place from the remaining portions of method 200. For example, selection of the capacitances and switch timing in 202 and/or 204 may be determined at manufacture of the IR detector or read out integrated circuit (ROIC). In some embodiments, the integration and/or averaging times may be reset, updated or adjusted at a later time by a user. However, there may be limitations on the amount by which the integration times and/or averaging times may be tuned based on the size of the capacitors and other components present in the IR Focal Plane Array system (e.g. IR detection system 100) being used.

At 206 and 208, fast frame images are captured. Thus, at 206, integrators perform integrations using the integration times set in 202. As mentioned above, portions of method 200 may be performed in another order, including simultaneously. For example, 206 may be performed before 204 in some embodiments. In other embodiments, 204 is performed before 206. Each integration corresponds to a subframe of a fast frame image. Similarly, at 208, averagers perform averages of the subframes using the averaging times (or number of integrations per averaging) in 204. Stated differently, the subframes (one subframe per integration) are averaged at 208 to provide fast frame images. In some embodiments, the number of subframes that are averaged is at least five and not more than twenty. Thus, the signals from the pixels of an image detector are received, integrated and averaged. Consequently, fast frame images may be captured. The target(s) are resolvable in the fast frame image. In some embodiments, 208 also includes use of the cascaded averagers. Thus, additional integrations and averaging can be carried out of the fast frame image data, which improve the noise, signal to noise and detectivity of objects.

At 210, targets are detected using the fast frame images. In some embodiments, 210 includes analyzing features, such as the size, shape and speed of features, to determine whether these target-like features are consisted with the movement of a target. Consequently, targets in the fast frame images may be detected. In some embodiments, targets are detected using the image data that has undergone processing by the cascaded averagers. In such embodiments, the fast frame image data is integrated and processed and the output of the cascaded averager used for target detection.

For example, the integration time for each of integrators 120 is set at 202. The averaging time, of number of integrations averaged, is set for each of averagers 130 at 204. IR detection system 100 is operated using these times at 206 and 208. Thus, signals from pixels 104 are integrated by integrators 120 for the integration time, at 206. Thus, subframes are provided. These subframes are provided to and averaged by averagers 130, at 208. Thus, multiple fast frame images may be provided by IR detection system 100. In some embodiments, further integrations and averaging may be performed by cascaded averagers 150. Thus, in addition to fast frame images provided from averagers 130, images may be output from cascaded averager(s) 150. The fast frames provided by averagers 130 may then be utilized at 210 to detect targets, at 210. Thus, using method 200 one or more of the advantages of IR detection system 100 may be realized.

Figure 3:
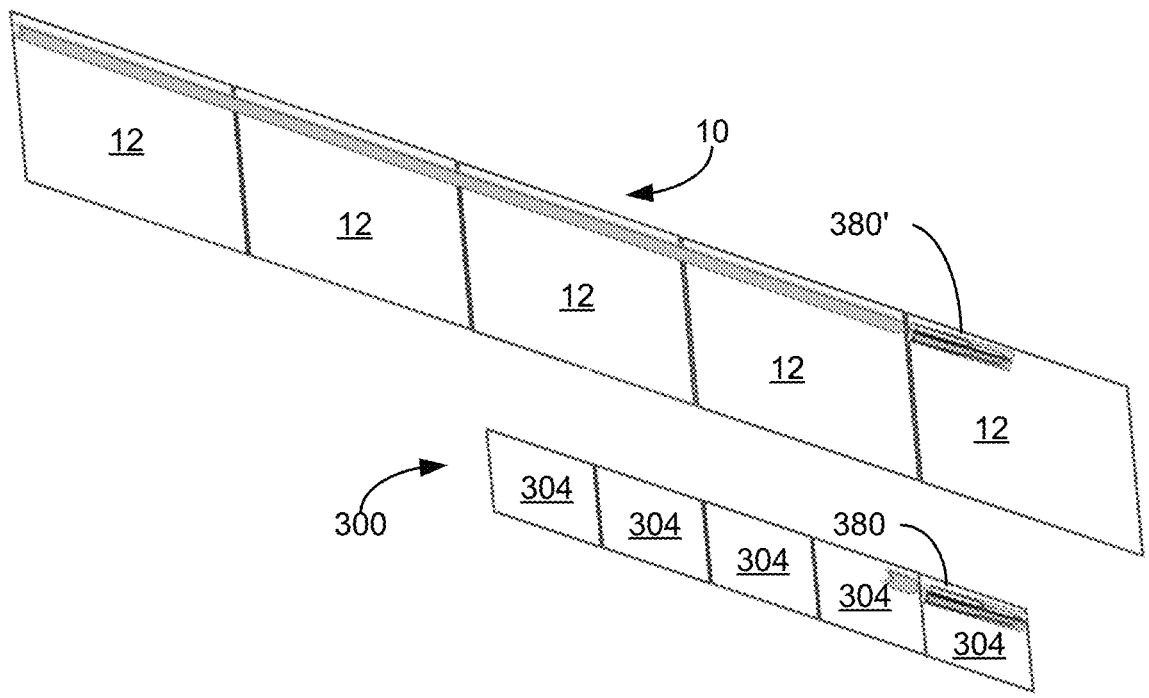
FIG. 3 is a diagram depicting a fast moving target detected using an embodiment of an infrared detection system including small pixels in comparison to a fast moving target detected using a system including larger pixels.
Figure 4:
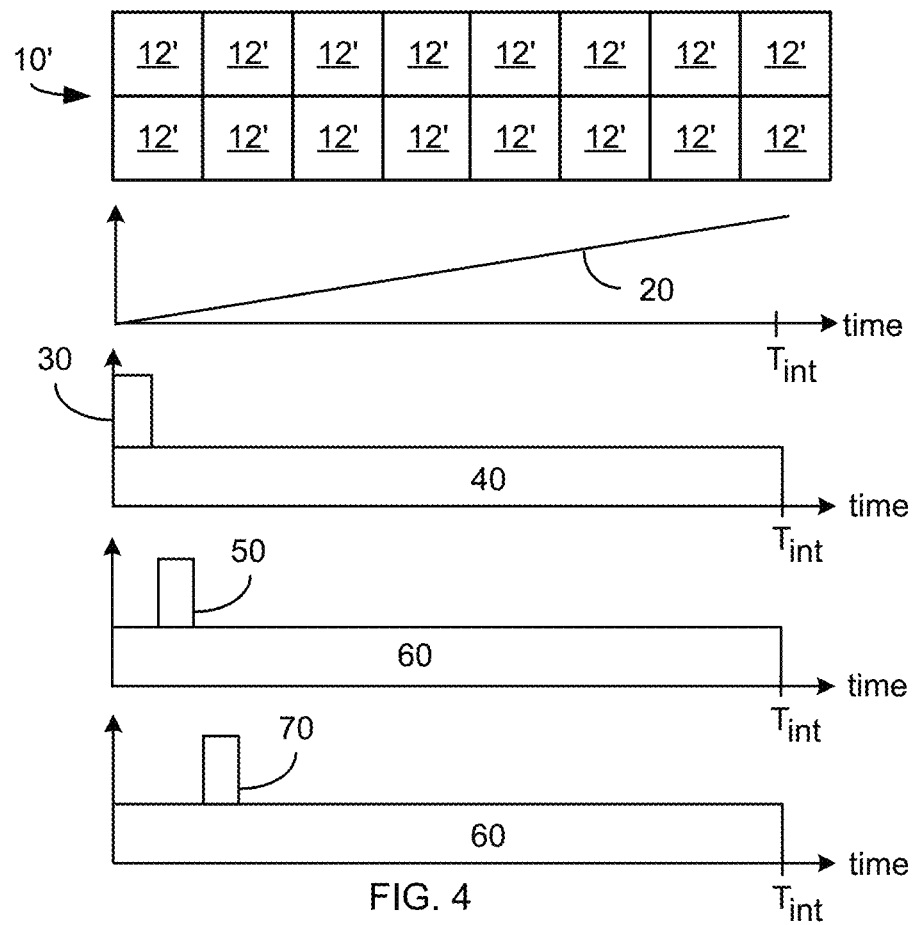
FIG. 4 illustrates operation of a larger pixel image detector usable with a long integration period compared to the dwell time of a target.
Figure 5:
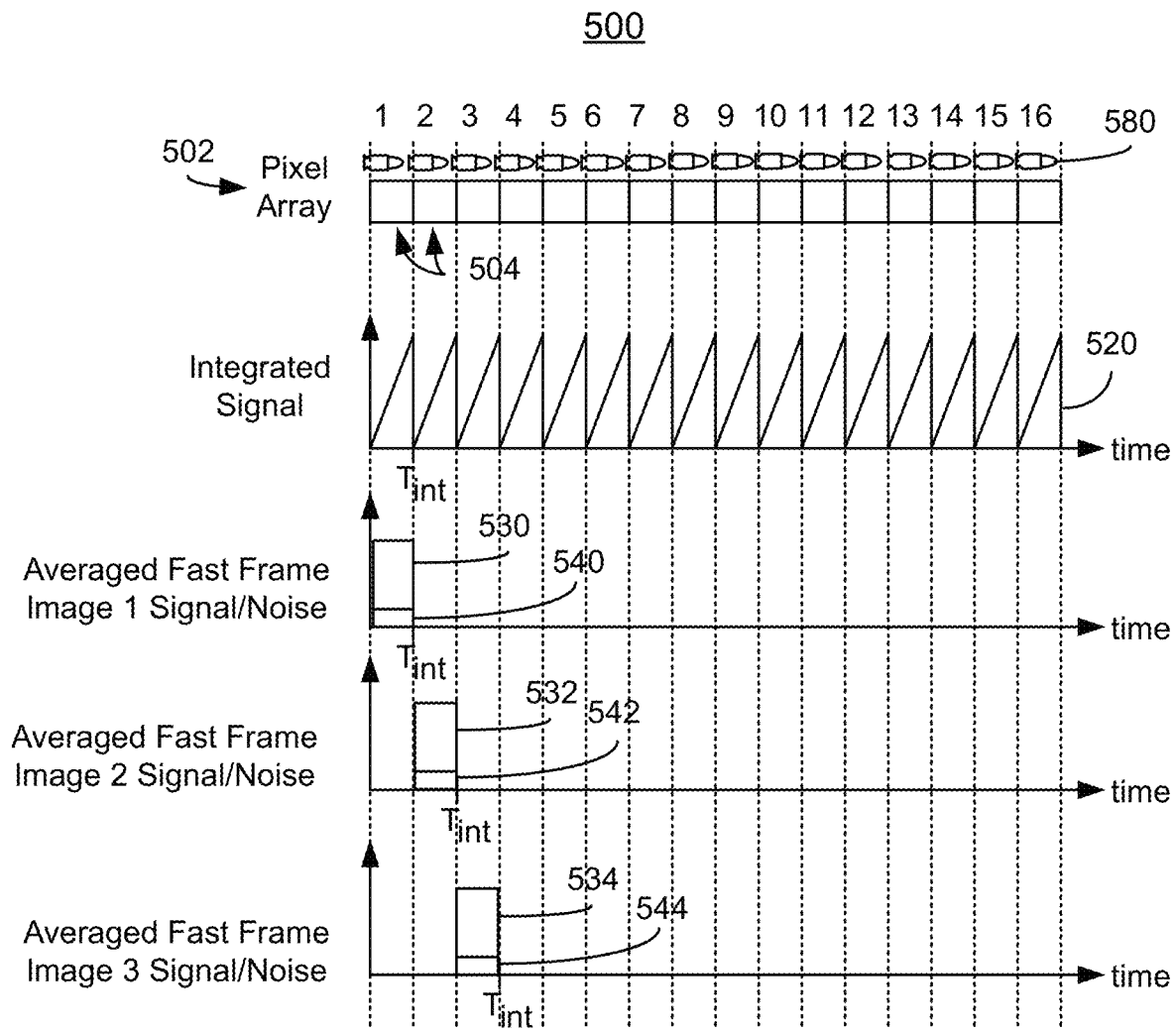
FIG. 5 illustrates operation of an embodiment of an infrared detection system that uses a small pixel image detector and an integration time that is short compared to the dwell time of a target.

The benefits of IR detection system 100 and method 200 may be understood with respect to FIGS. 3-5. FIG. 3 is a diagram depicting a fast moving target 380 detected using an embodiment of IR detection system analogous to IR detection system 100 in comparison to a fast moving target 380' in sensed in a system including larger pixels. FIG. 4 illustrates operation of a larger pixel image detector usable with a long integration period compared to the dwell time of a target. FIG. 5 illustrates operation of an embodiment of an IR detection system, such as IR detection system 100, that uses a small pixel image detector and a short integration period compared to the dwell time of a target.

Referring to FIG. 3, the appearance of a target 380/380' for images captured using two image sensors is depicted. Target 380' is shown in an image 10 having regions 12 ("image pixels") corresponding to larger image sensor pixels. Because larger pixels are used, a longer integration time is also employed. Target 380' occupies a small fraction of the area of image pixel 12 and, therefore, a small fraction of the area of the corresponding pixel in the image detector. Because target 380' occupies a smaller fraction of the (larger) instantaneous field of view of a larger pixel, a larger fraction of the signal for image pixels 12 is from the background. Thus, larger integration times can be used to obtain sufficient signal from target 380' to distinguish target 380' from the background. However, when a long integration time is used for the larger pixels, target 380' is smeared across five image pixels 12 in image 10.

FIG. 3 also depicts target 380 in image 300 having image pixels 304 corresponding to a small image sensor pixels (e.g. pixels 104) and for which a small integration time is used. Image 300 is a fast frame image captured using IR detection system 100, an analogous system and/or an analogous method. Fast frame image 300 includes smaller image pixels 304 corresponding to small pixels 104 in image detector 102. Target 380 occupies a large fraction of image pixel 304 as well as a larger fraction of the corresponding pixel 104. Consequently, target 380 accounts for a larger fraction of the signal for image pixel 304. Stated differently, the relative background signal for image pixels 304 is reduced compared to a larger pixel. Therefore, target 380 may be discernable over the background signal even for shorter integration times. Because small integration times and averaging are used in forming fast frame image 300, there is very little smearing of target 380, with target 380 being memorized in the averaging circuits. Thus, target 380 extends over less than two image pixels 304. In some embodiments, a shorter integration time allows target 380 to be considered to be essentially "frozen" in (e.g. confined to) a single image pixel 304 of a fast frame image. Thus, a reduction of the background and the optimization of the integration time based on the dwell time (e.g. to match the dwell time) allows for improved ability to resolve target 380 in fast frame image 300. Because fast frame image 300 is captured using the high gain, smaller pixels 104, shorter integration times that are selected based on the speed of target 380, and averaging, target 380 has minimal blur, a higher signal compared to background and is resolvable in fast frame image 300.

FIGS. 4 and 5 compare signal processing corresponding to image 10 and image 300, respectively. Thus, FIG. 4 depicts image detector 10' and pixels 12' corresponding to image and image pixels 12. Also shown are graphs depicting various signals versus time. The integration time, $T_{int}$, is also depicted. FIG. 4 depicts the charge buildup 20 on the corresponding charging capacitor for a pixel 12'. Because pixels 12' are large, a long integration time is used. Because of the speed of the target, pixel 12' only has the target in pixel for a small portion of the integration time. However, the background is integrated for the full integration time. Thus, also shown in FIG. 4 are the target signals 30, 50 and 70 for three pixels 12' and the corresponding background signal 40, 60, and 80, respectively. Consequently, larger pixels 12' have a reduced signal to background ratio.

In contrast. FIG. 5 depicts pixels 504 in image detector 502 corresponding to image 300 and image pixels 304. Thus, 502 refers to the pixel array shown in FIG. 5. For clarity, only two pixels 504 are labeled in image detector 502. Also shown is target 580, which is a Mach velocity projectile (e.g. a bullet) in the embodiment shown. Multiple instances of target 580 (e.g. fast frame images 1 through 16) are shown because the integration time, $T_{int}$, is set to be sufficiently small that target 580 is captured in a single pixel 504 during each integration period. Stated differently, the field of view and pixel size of the image detector 502, as well as the integration time, are chosen such that target 580 travels a distance equal to the width of one pixel 504 during the integration time. Thus, the frame (frames 1 through 16) for each pixel 504 includes an image of target 580. The charge 520 developed on pixels 504 is also shown in FIG. By adjusting the integrated signal level and optical design of the lens light collection for each pixel 504, the background may be reduced and the signal for projectile 580 enhanced. Also shown in FIG. 5 are the target signals 530, 532 and 534 for three of pixels 504 and the corresponding background signals 540, 542, and 544, respectively. Since the background goes directly as pixel size and a fast F number lens tightly focuses light, small pixels 504 can be used and the background 530, 532 and 532 becomes a smaller with respect to the signal 540, 542 and 44.

Small pixels 304 and 504 with the integration times matched to the dwell time improve the SNR. It has been determined that SNR at high resolution may be more important in fast target detection than is high NEDT. In some embodiments the smaller pixel high resolution IR detector, such as image detector 102, can achieve fast integration and framing while still allowing for good sensitivity and detection range. Thus, using IR detection system 100 and method 200 targets such as targets 380 and 580 that are dim, small and fast moving can be imaged in fast frame images with limited smearing and sufficient signal to background.

Figure 6:
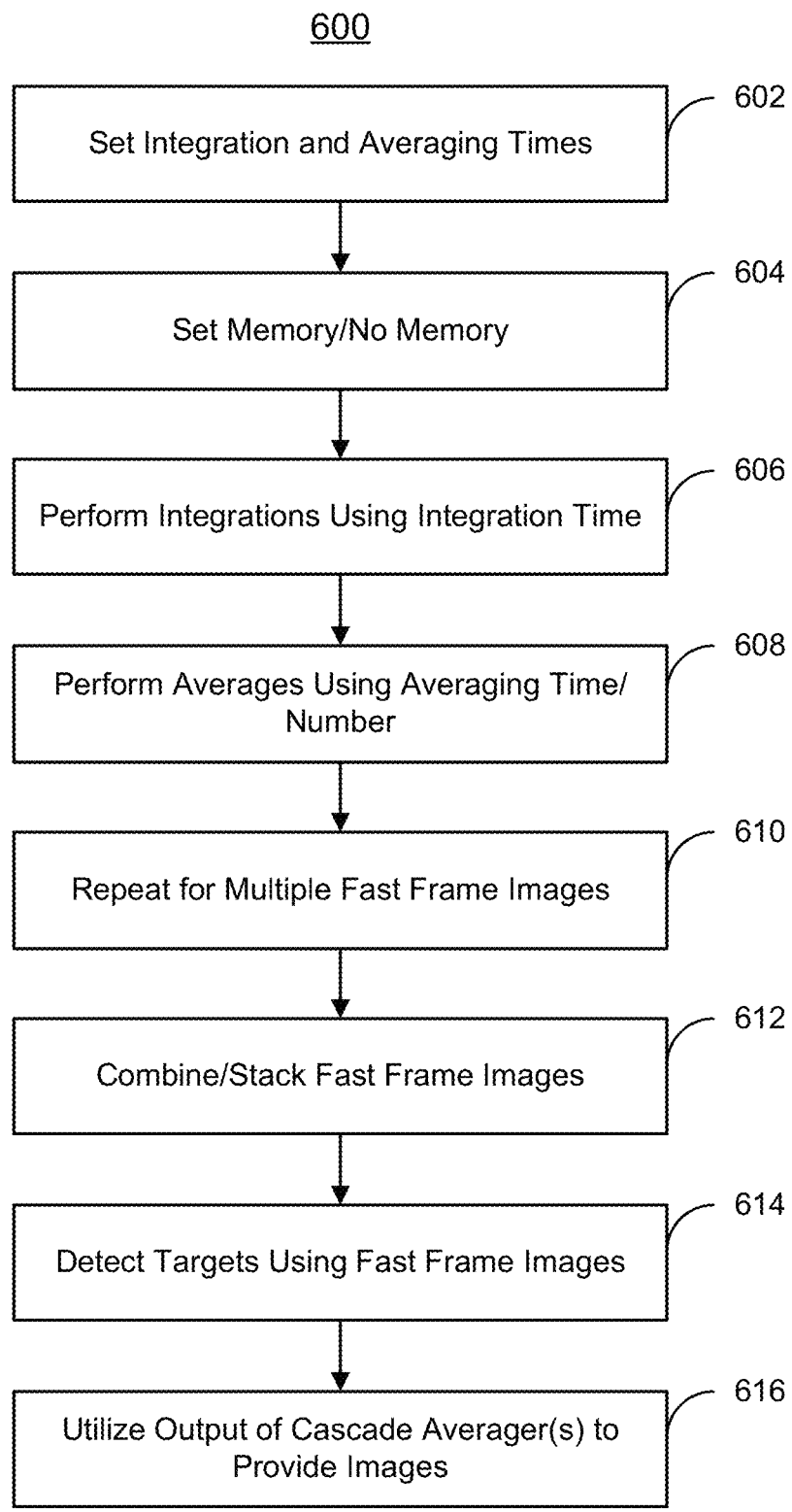
FIG. 6 is a flow chart depicting an embodiment of a method for detecting moving targets.

FIG. 6 is a flow chart depicting an embodiment of method 600 for detecting small, dim, distant and/or fast targets. Method 600 may be used with and is described in the context of IR detection system 100. Method 600 may include substeps. In addition, in some embodiments, steps and/or substeps may be performed in another order, including in parallel. Further, although described in the context of single pixel, method 600 may extended to multiple pixels in a detector array. For example, the pixels in the detector may be raster scanned, portions method 600 may be carried out for each pixel and the output used to provide a video readout or still image.

The integration time and averaging time (or number of averages) are set, at 602. Thus, 602 is analogous to 202 and 204. The integration and averaging times are set based on the speed of the target(s) and the dwell time of the target(s). Thus, the size of the pixels and speed of the target(s) with respect to the pixels are utilized in setting the integration time.

The memory for the readout circuits is optionally set, at 604. In some embodiments, setting of the memory for the readout circuits corresponds to selecting whether the averaging capacitors for the averagers are precharged. For example, whether switch(es) between the averaging capacitor and ground are briefly closed at the start of each averaging interval determine whether the averaging capacitors for averagers are precharged. If the averaging capacitors are not reset, the signal memory from past fast frame(s) persists. The signal decay on the averaging capacitor has an effect decay and time constant. Thus, setting the memory at 604 may be considered to be setting the time constant for decay for the averagers.

If memory is set at 604, several of the fast frame images are averaged without a reset of the averaging capacitor. Thus, an unsmeared image having multiple successive views of the target corresponding to each fast frame image is provided. Since the smaller objects/fast moving targets do not coincide on many pixels, the memory can be beneficial to target acquisition, target SNR, target direction determination, and target destination determination. This memory of past signals can be configured to last long enough for machine vision or human observers to see and take action upon a dynamic target. If instead there was no memory, the visibility in the image and data would be diminished to a signal frame or few frames. In addition to the lack of visibility of a target in a system without the memory, the momentary appearance of the target may appear spatially and temporally in a pattern similar to noise. Thus, it may be desirable at 604 to set memory for the averager(s).

In some embodiments, 602 and 604 may be performed at a different time and/or place from the remaining portions of method 600. For example, selection of the capacitances and switch timings in 602 and/or 604 may be determined at manufacture of the IR detector. In some embodiments, the integration and/or averaging times as well as the memory capability may be reset, updated or adjusted at a later time by a user. However, there may be limitations on the amount by which the integration times and/or averaging times may be tuned based on the size of the capacitors and other components present in the IR detector being used.

At 606 and 608, fast frame images are captured. Thus, at 606, integrators perform integrations using the integration times set in 602. Each integration corresponds to a subframe of a fast frame image. Further, the averaging capacitors in the averagers are optionally discharged/precharged based on the setting in 604. Similarly, at 608, averagers perform averages of the subframes using the averaging times (or number of integrations per averaging) in 602. Consequently, 606 and 608 are analogous to 206 and 208, respectively. Thus, the signals from the pixels of an image detector are received, integrated and averaged. Consequently, fast frame images may be captured. The target(s) are resolvable in the fast frame image. In some embodiments, 608 also includes use of the cascaded averagers. Thus, additional integrations and averaging can be carried out of the fast frame image data.

The integrating and averaging of 606 and 608 are repeated for multiple fast frame images, at 610. These multiple images may be combined or stacked, at 612. As a result, frame stacking in one frame for data from the image detector can be achieved. This multiple frame sampling creates a temporal response to high time frequency objects due to memory averaging effects. This has a similar performance to temporal band pass filters where a high frequency temporal response can capture high frequency temporal events.

At 614, targets are detected using the fast frame images. In some embodiments, 614 is analogous to 210 of method 200. Further images having additional integration and averaging may be provided using the output of the cascaded averagers, at 616.

For example, in IR detection system 100, the integration time for each of integrators 120 and the averaging times for averagers 130 are set at 602. The ability of IR detection system 100 to use memory is also set, at 604. IR detection system 100 is operated using these settings at 606 and 608.

Thus, signals from pixels 104 are integrated by integrators 120 for the integration time, at 206. Thus, subframes are provided. These subframes are provided to and averaged by averagers 130, at 608. In some embodiments, further integrations and averaging may be performed by cascaded averagers 150. Thus, in addition to fast frame images provided from averagers 130, images may be output from cascaded averager(s) 150. The integrating and averaging are repeated for multiple fast frame images at 610. These multiple fast frame images may be combined, or stacked, into a single image at 612. Targets may also be detected using the fast frame images at 614 in a manner analogous to that discussed above. The fast frame images provided by averagers 130 may be utilized at 210 to detect targets, at 612. Data from cascaded averagers may also be used to provide images at 616.

Thus, using method 600 dim, fast moving, distant targets may be detected. For example, in some embodiments rifle bullets may be detected at a distance of 1 kilometer. In addition to setting memory, integration times and averaging times, components such as the optics, spectral band, and capacitor size may be optimized to match the integration time with a common target transit time, for example for hostile fire or missile detection. As a result, the target (e.g. bullet or missile) may be frozen in each image pixel, allowing a low smear rendition so that the downstream processing can better ascertain that the target is a projectile. Further, the increase in signal brightness and geometry of the streak of the projectile (e.g. over multiple fast frames) can be considered image encoding that may be used to determine the inbound or outbound nature of the sensed target. The high spatial frequency response of the small pixel, such as pixels 104, and matched high frequency optics allows closely spaced in time, near adjacent samples of both the signal and background noise. The signal and background are each averaged. The results can be used at 612 to create the combined frame. The combined frame may be a stored signal, superimposing the projectile across the N fast frames. A combined frame can also be viewed as an average stacked composite image. Such a combined frame/combined image may be advantageous in detecting and sensing smaller faster moving objects and projectiles. Further through fast framing and frame stacking, the target may be captured in multiple successive adjacent (or nearby) pixels. Thus, the spatial location of a track of the target is essentially encoded into the stacked image. This enables deriving the shot destination of a semi-linear projectile and can be calculated in flight with only a few fast averaged frames.

Figure 7:
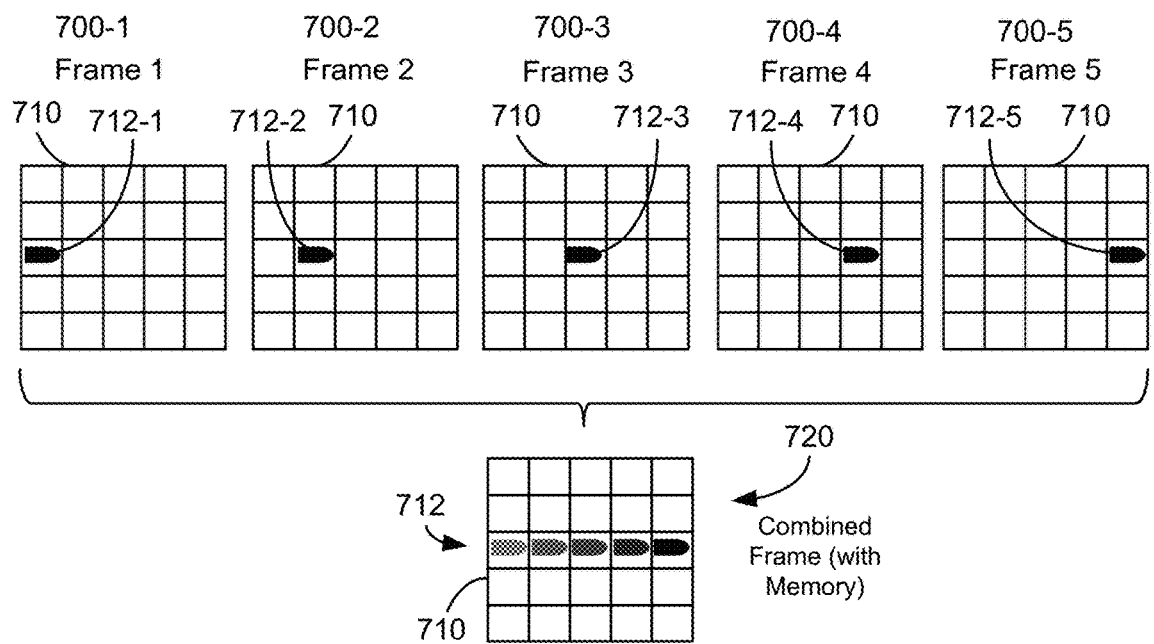
FIG. 7 depicts an embodiment of a fast frame images having a target detected using an embodiment of the method and system.

For example, FIG. 7 depicts fast frame images 700-1, 700-2, 700-3, 700-4 and 700-5 (e.g. frames 1 through 5) that are collectively referred to as fast frame images 700. Fast frame images 700 may be captured at 606, 608, and 610 of method 600. Each of fast frame images 700 includes image pixels 710 that correspond to small pixels, such as pixels 104, 304 and/or 504. The target (e.g. a bullet in the embodiment shown) is shown as target 712-1, 712-2, 712-3, 712-4 and 712-5 in successive fast frame images 700-1, 700-2, 700-3, 700-4 and 700-5, respectively. Because of the integration time set at 602, the sizes of pixels 710 and the target speed, target 712-1, 712-2, 712-3, 712-4 and 712-5 is in adjoining pixels 710 in successive fast frame images 700-1, 700-2, 700-3, 700-4 and 700-5. Target 712-1, 712-2, 712-3, 712-4 and 712-5 is shown as in the center of and confined to a single pixel 710 for each fast frame image 700-1, 700-2, 700-3, 700-4 and 700-5. However, target 712-1, 712-2, 712-3, 712-4 and 712-5 may extend over multiple pixels 710 and/or may not be centered. Target 712-1, 712-2, 712-3, 712-4 and 712-5 may desired to be at or nearly "frozen" in individual fast frame images 700-1, 700-2, 700-3, 700-4 and 700-5 to reduce smear.

FIG. 7 also depicts combined, or stacked, frame 720 formed at 612 from fast frame images 700. Combined frame 720 is formed when memory is selected for pixels at 604. In some embodiments, the memory for combined frame 720 may be set at 604 to have a time constant equal to the integration time divided by 0.1-0.9. For example, the integration time for fast frame images 700 may be on the order of two hundred microseconds. Thus in this example, the memory time constant for stacked frame 720 including five frames may be on the order of one millisecond. The short integration time reduces smear and enhances SNR (signal to noise ratio) and SBR (signal to background ratio). The longer time constant allows for history of the moving target to be present in the combined frame. Further, slower moving objects show fewer memory effects because the changes in the slowly moving background between fast frame images are minimal. The background thus remains relatively constant in the combined frame. Consequently, combined frame 720 includes target 712 in successive adjoining image pixels 710 with varying intensity. No such variation would be present for slow/unmoving objects in combined frame 720. Instead, the stationary background remains substantially unchanged. Consequently, the trajectory of target 712 across combined image 720 can be determined.

Combined frame 720 with adaptable decay (e.g. memory) allows for direction and velocity calculations. The length of the streak of the target (e.g. over several milliseconds and/or several fast frames) and target spacing in the image allows for determinations of trajectories. For example, calculation of inbound and outbound targets may be possible. Stated differently, a two dimensional image is encoded with the dashes (e.g. corresponding to the positions of the target in a series of fast frame images) representing the measured signature of the non-accelerating projectile. If the streak length increases as time progresses, the target's relative angle is closing in to the image detector's field of view. Conversely, if the dash pattern of a steady non-accelerating projectile shortens as a function of time, then it is likely that the projectile is receding. Therefore, the multiple fast frame stacking of the projectile, be it a bullet, mortar, missile or hypersonic vehicle, allows for three-dimensional mapping of the travel of the moving object. In combined frame 720, the dashes in the streak correspond to the lighter colored targets 712. Thus, the trajectory of target 712 toward the right of the page may be determined. Thus, sensing and image combining in method 600 uses an adaptable time constant of the fast frame averager, which causes past fast frames' signal intensity (for example from a moving bullet) to decay in an exponential-like manner.

In some embodiments, IR detection system 100 and methods 200 and 600 are configured to enable a worst case detection of the target. The worst case detection of a target may occur when the target is imaged and its intensity divided onto 4 pixel corners essentially splitting the total energy of a distant point source bullet into ~4 adjacent pixels. In general the Noise Equivalent Power (NEP) of a sensor is provide by Equation 1 below:

$$NEP_{BG}(\lambda, T \text{ int}) = \left[\frac{Ebg * A \det *}{qe * T \text{ int}}\right]^{1/2} \left[\frac{h * c}{\lambda}\right] \quad \text{Eq. 1}$$

In general the lowest detectable signal is the noise equivalent power of the focal plane array of image detector 102. In general the minimization of noise is desired to achieve the lowest possible detectable signal. The SNR versus range is derived accounting for atmospheric extinction factor, adding an oversampling factor term that accounts for smaller pixels' PSF blur fraction for a given lens F number, and using the Irradiance ($I_{targ}$) and Emissivity. A SNR equation is defined as a function of range.

$$SNR = \frac{1}{NEP * CLUTFact} * \frac{\varepsilon_{targ} I_{targ} * A_{lens} e^{-(\alpha_{atm} * Range)} * \text{Mun\_dwell} * PSF_{ff}}{R^2} \quad \text{Eq. 2}$$

where: $\varepsilon_{targ}$ is the emissivity in IR bands $\alpha_{atm}$ is the atmospheric extinction $I_{targ}$ is the munition Radiance in W/sr/cm times the area of the target/object $PSF_{ff}$ relates to the ability of the optics Point Spread Function fill factor areal percentage to capture all bullet thermal energy $A_{lens}$ is the collection area R is the bullet range.

Mun-dwell is the time the percentage of time the target signal dwells in a single pixel compared to the integration time. If the bullet dwells in a pixel for the full fast frame time, then mun-dwell=1

Tint is the integration time

Equation 2 indicates that the SNR increases with increased target irradiance, lens area, and detector D*. Based on Equation 2, SNR also increases with shorter range, and smaller detectors matching a proper pixel pitch width. This provides the sensor and system design terms and parameters which may be used to optimize high definition munition warning system (HDMWS) or other parameters. The residual clutter after image processing may be near zero. In some embodiments, an active targeting laser (not shown) or including the solar reflected response component has the effect of increasing $I_{targ}$ because reflection off the target adds to the total integrated signal with the in-band portion of the signal reflection from the target being used. The addition of reflected energy depends on geometry and illumination and/or reflective component based on time of day illumination source geometry and shooter sensor geometry at minimum.

Figure 8:
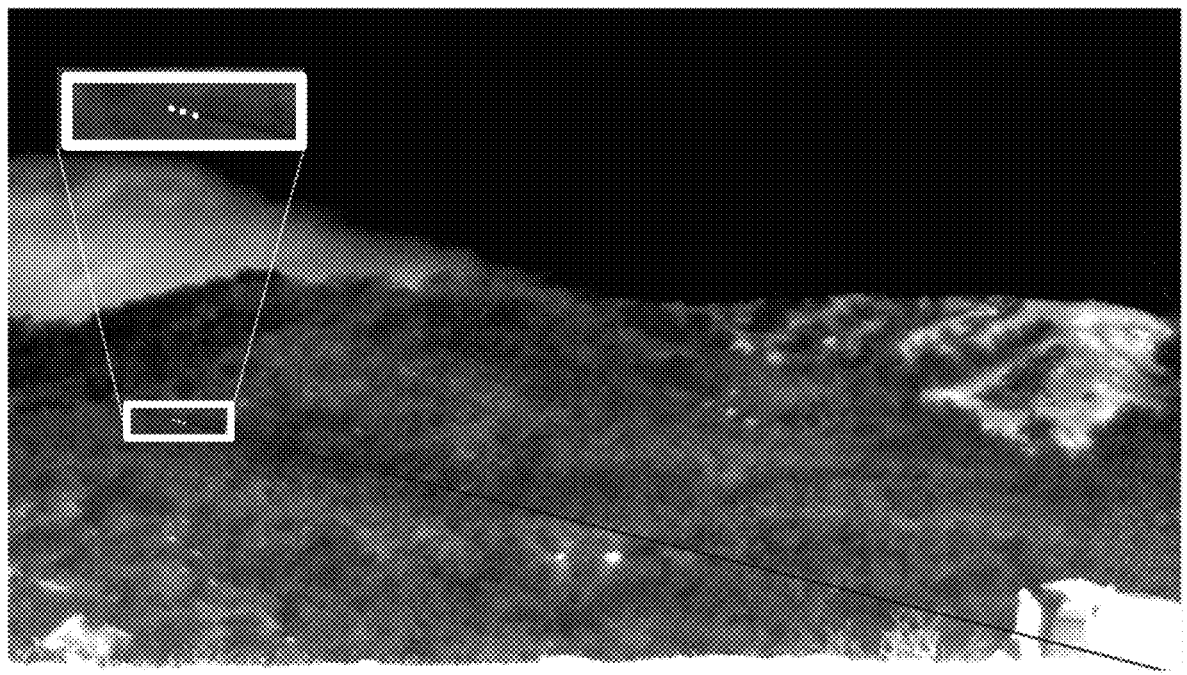
FIG. 8 illustrates an exemplary embodiment of an image captured in which fast moving targets are detectable.

Thus, using method 600 and IR detection system 100, detection of dim, distant fast moving targets may be improved. For example, FIG. 8 illustrates an exemplary embodiment of an image captured in which fast moving targets are detectable. As can be seen in the inset of FIG. 8, dots analogous to targets 712 of combined frame 720 are shown. Using this track of dots, which represent the images of an actual bullet, the presence of the moving target as well as the trajectory may be determined.

Figure 9:
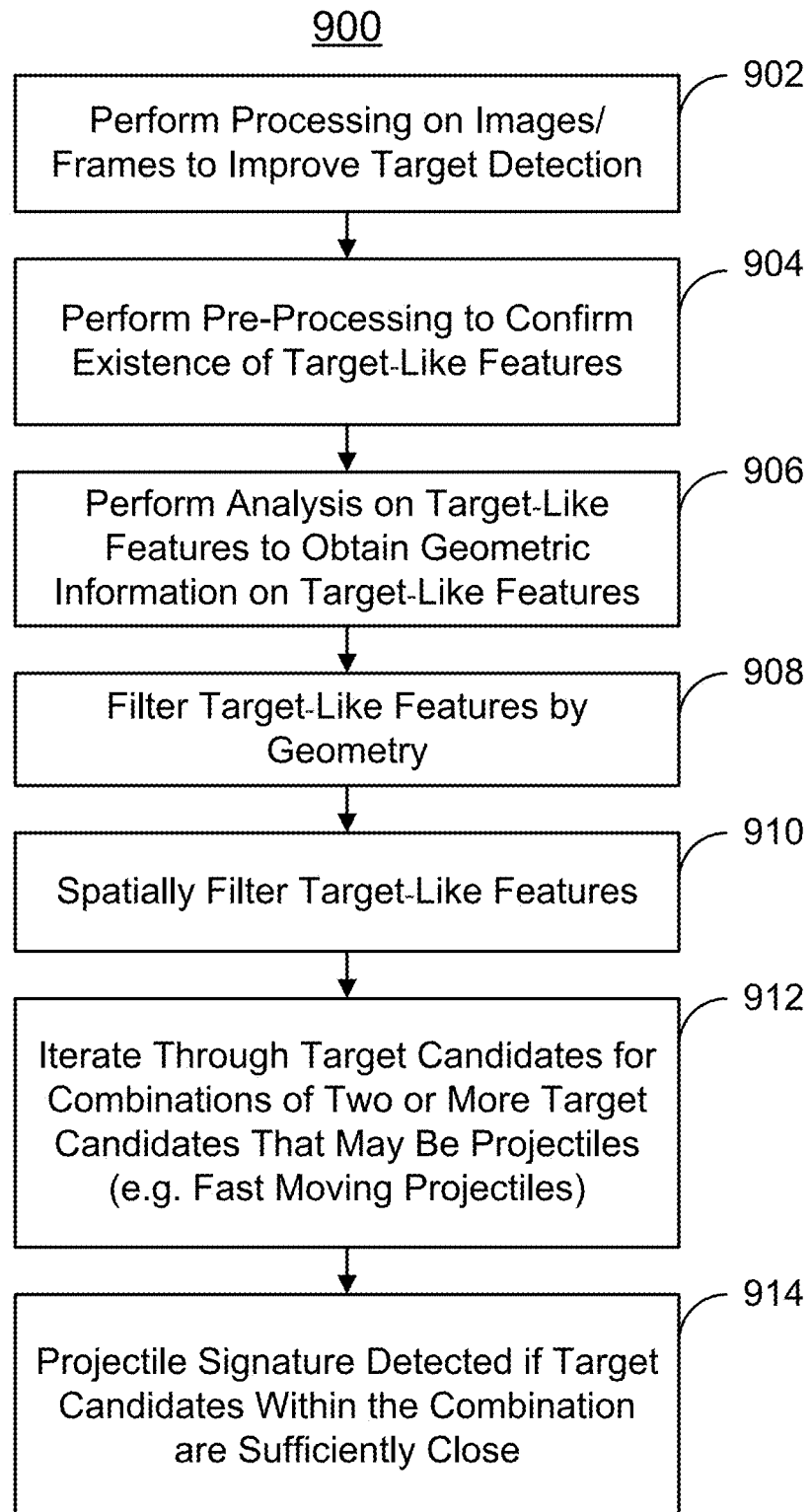
FIG. 9 is a flow chart depicting an embodiment of a method for detecting targets.

FIG. 9 depicts an embodiment of a method 900 for detecting targets based upon fast frames, similar to fast frames 700 or combined frames 720 and/or 720'. Although one embodiment of the method is described, other embodiments having fewer, more, additional and/or different processes may be employed. The method 900 may be performed on fast frame images of data captured using the mechanisms described herein, such as IR detection system 100 and method(s) 200 and/or 00. Method 900 might be used on multiple frames and/or combined frame(s). For a combined frame, a single target might appear at multiple locations in a single (stacked) frame. For multiple frames, a single target may appear as a target-like feature having a different location in each frame. Although certain targets, such as bullets, missiles or other projectiles, have a characteristic shape, the corresponding target-like feature may be irregularly and/or unrecognizably shaped in at least some frame. Method 900 may be used for frames in which multiple projectiles are to be detected.

Processing is performed on the frame(s)/image(s) to improve the image for detection of target-like features, at 902. The target-like features are candidates for projectiles desired to be detected. For example, temporal filtering, spatial filtering, estimation of the background signal, frame differing and/or thresholding may be performed on the images. Temporal Spatial processing at 902 uses various spatial and temporal filtering to detect and extract targets in a cluttered background scene. Automated Target Recognition and ID algorithms can be used to perform detection and ID in cluttered environments. In some embodiments, artificial intelligence and/or machine learning-based algorithms can be used for more accurate target detection and identification. This processing may remove data that is outside the thresholds set for detection of projectiles, for example having speeds too low (e.g. not moving or moving at very low speeds).

Pre-processing is also performed, at 904. This pre-processing may be used to help confirm the existence of the objects and the correspondence of the target-like features to objects or projectiles. For example, regularization such as hole-filling may be performed to remove holes within target-like features. Background noise may be reduced or eliminated. Thus, target-like features that are continuous and completely filled are formed. These target-like features may correspond to solid objects that may be targets. Thus, the result of 904 are continuous target-like features (e.g. target-like features for which holes have been filled).

Analysis is performed on the continuous target-like features, at 906. The analysis determines information such as the geometric characteristics of each of the continuous target-like features. For example, the centroid, height, width, area, other features of the size and shape and/or other characteristics may be obtained. Thus, each continuous target-like feature may be geometrically characterized.

The continuous target-like features are filtered based on their geometry, at 908. For example, filtering may be performed based on size, at 908. Thus, continuous target-like features that are too large or too small may be removed from the candidates for projectiles. In some embodiments, continuous target-like features that are large and/or have a particular shape (e.g. buildings or people) may be removed. The continuous target-like features are also spatially filtered, at 910. For example, continuous target-like features may be filtered based upon their distance. Thus, continuous target-like features that correspond to objects that are too distant (and remain distant) may also be removed from the list continuous target-like features that are candidates for targets. Thus, the remaining continuous target-like features are target candidates (e.g. may be targets).

The target candidates for the frame(s) are iterated through to determine combinations of two or more target candidates that might correspond to moving targets (e.g. projectiles), at 912. The two or more target candidates in the combination are such that movement is indicated between the frame(s). Because a projectile moves, a target candidate corresponding to a projectile occupies different locations in different frames (i.e. correspond to a target at different locations)

and/or changes size (e.g. grows larger as the target approaches the sensor). Thus, two or more analogous target candidates in multiple frames may correspond to a single target. For a combined frame, multiple target candidates in the same frame can correspond to a single target. In some embodiments, the target candidates that are closely spaced between frames (or closely spaced in a single stacked frame) are considered possibilities for a target. The close spacing means that the target candidates correspond primarily to fast moving objects. In some embodiments, the target candidates are required to be no more than a minimum distance apart.

Target signatures are detected at 914 for target candidates within a combination that sufficiently close. Thus, such target candidates may correspond to a fast moving projectile. In some embodiments, this is implemented by requiring that within a combination of target candidates, the distance between the target-like features is within a particular error range. For example, if distance between a target candidate at one location and a closest target candidate in the same combination is within a range (±ERR). Thus, using method 900, projectiles may be detected from frames 700, 720 and/or 720'. Using this data, projectiles may be located and traced back to their point of origin. Within a combination, between frames (or separated in a stacked frame) target-like features in a combination are close enough to be considered close enough to be a single object that is moving at high speed.

Thus, through the use of fast frames in which small, dim, fast moving and potentially distant targets can be resolved with little to no blur, targets can be identified using method 900. Further, this identification process may take place rapidly. Consequently, decisions can be made regarding threat velocity angle of ingress or egress, probability of projectile hitting a region, and location of shooter. As a result, mitigating actions may be taken.

Figure 10A:
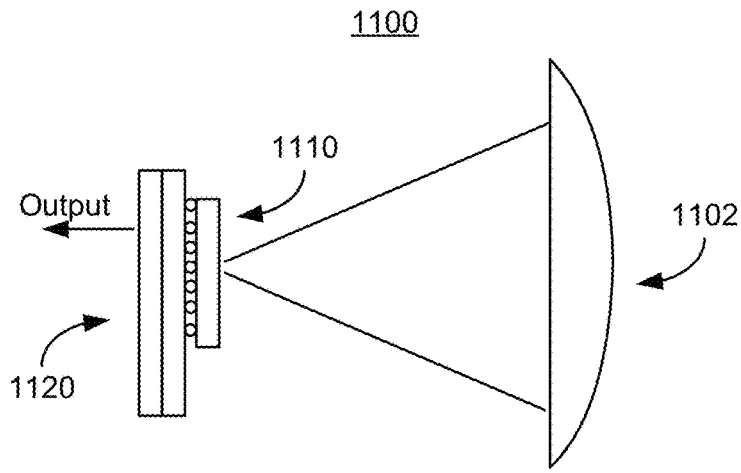
FIGS. 10A-10B depict an embodiment of an infrared detection system.

FIGS. 10A-18 describe detection systems and techniques usable with IR detection system 100 and/or methods 200 and/or 600. FIGS. 10A-10B are block diagrams depicting an embodiment of detection system 1100. FIG. 10A is a side view of detection system 1100. FIG. is an exploded view of a portion of detection system 1100. FIGS. 10A-10B are not to scale and only some components are shown. For example, FIG. 10B is intended to indicate relative areas and thus does not include various elements of detection system 1100. In some embodiments, detection system 1100 is an infrared radiation (IR) detection system. Thus, system 1100 is described in the context of infrared detection. However, in some embodiments, detection system 1100 might be used in connection with other wavelengths of light. IR detection system 1100 includes lens 1102, detector array 11110 that includes an array of pixels, and read out integrated circuit (ROIC) 1120. Lens 1102 focuses light down to a tightly focused spot. In some embodiments, lens 1102 focuses light to cover only a few pixels at a time. For example, the spot may impinge on 1, 2, 3, 4, 5 or 6 pixels of detector array 1110 at a particular time. In some embodiments, lens 1102 is configured to have an f-number equal or less than that required for Nyquist sampling with 5 micron pixels (e.g. typically less than 2). For example, lens 1102 may have an f-number greater than 0.8 and less than 1.5 for a midwave infrared band detector. In some embodiments, lens 1102 has an f-number that is nominally one. In other embodiments, lens 1102 may have a different f-number, including but not limited to 1.8-2.3 (e.g. nominally 2.0).

Figure 10B:
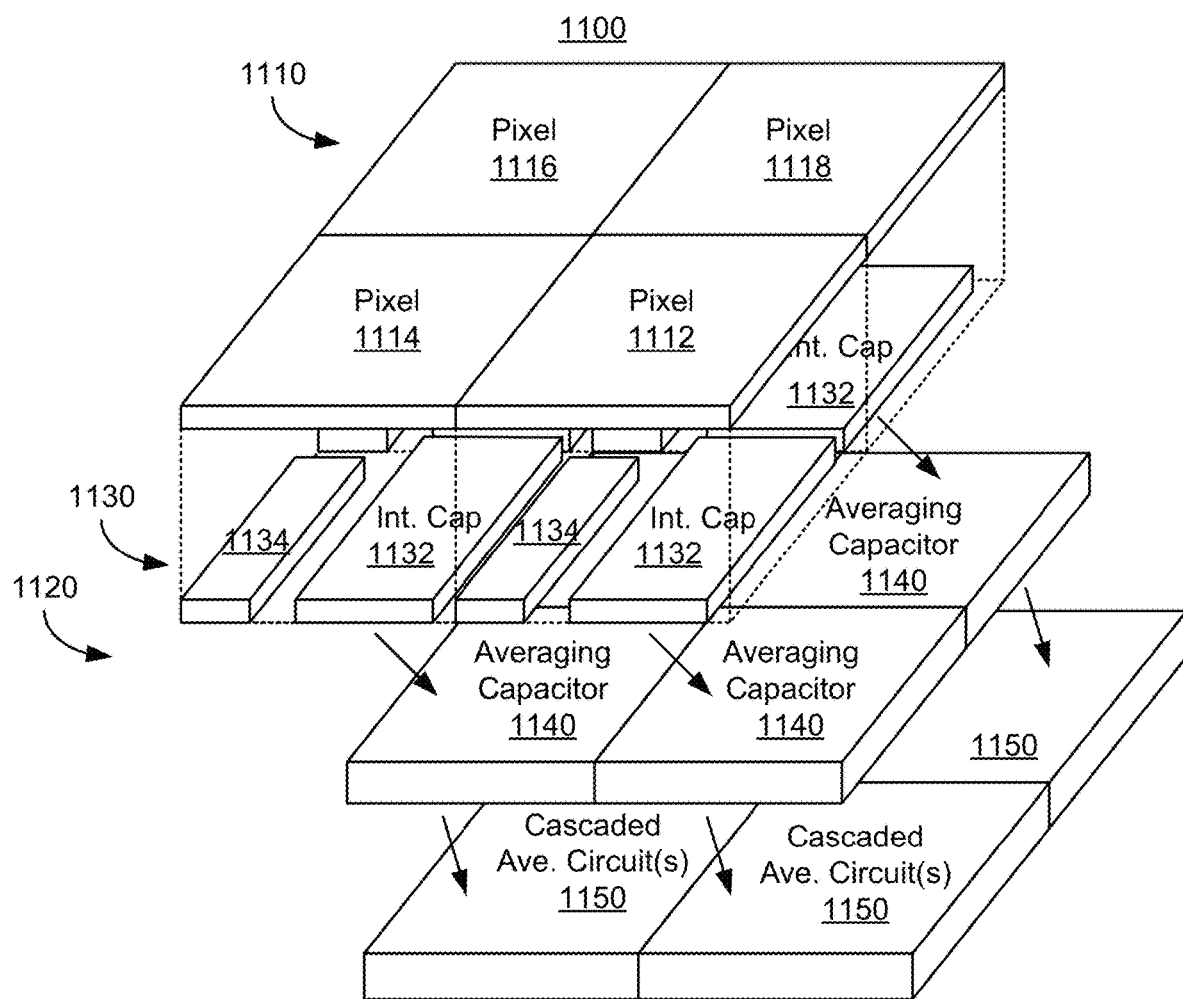

Detector 1110 is shown as a monolithic hybrid bumped interconnected detector. For example, detector 1110 may be a low band gap IR detector. In some embodiments, detector 1110 may be another type of detector. Detector 1110 includes an array of pixels, of which only four pixels 1112, 1114, 1116 and 1118 are shown in FIG. 10B. In some embodiments, pixels 1112, 1114, 1116 and 1118 are aligned with solder bumps (not shown in FIG. 10B) which provide connection to the underlying ROIC 1120. Pixels 1112, 1114, 1116 and 1118 may be considered to function as photodiodes. In some embodiments, pixels 1112, 1114, 1116 and 1118 have the same size. In some embodiments, pixels 1112, 1114, 1116 and 1118 are substantially square. In other embodiments, pixels 1112, 1114, 1116 and 1118 may have different sizes and/or other shapes. Pixels 1112, 1114, 1116 and 1118 are desired to be small. For example, detector 1110 may have a pixel pitch of less than ten micrometers (e.g. pixels 1112, 1114, 1116 and 1118 being smaller than 10 μm×10 μm). In some embodiments, pixels 1112, 1114, 1116 and 1118 may have a pitch of not more than eight micrometers ((e.g. pixels 1112, 1114, 1116 and 1118 being smaller than 8 μm×8 μm). In some embodiments, detector 1110 may have a pixel pitch of not more than six micrometers. For example, pixels 1112, 1114, 1116 and 1118 may have a pitch of five micrometers or less (e.g. pixels 1112, 1114, 1116 and 1118 being 5 μm×5 μm or smaller). In some embodiments, detector 1110 may have a pixel pitch of not more than three micrometers. Thus, pixels 1112, 1114, 1116 and 1118 are small in size. The number of pixels in the array of detector 1110 may be large. For example, a 1080×1920 array of pixels may be used in detector 1110. Other numbers, aspect ratios, numbers or pixels and/or other geometries are possible. The pixels in the array of detector 1110 may be read out and processed in a raster scan.

ROIC circuit 1120 includes fast integration and readout circuits 1130 utilized in providing a faster readout and may include cascaded averaging circuits 1150. Each fast readout circuit 1130 includes integration capacitor 1132, additional component(s) 1134, averaging capacitor 1140 and may include other elements. For example, switches and other elements are not shown. For example, a switch coupled between capacitors 1132 and 1140 may be used in periodically providing the signal on integration capacitor 1132 to averaging capacitor 1140. Additional component(s) 1134 may include a transistor coupled adjacent to the corresponding pixel 1112, 1114, 1116 or 1118 and integration capacitor 1132.

Integration capacitor 1132 and additional component(s) 1134 are laid out in a manner that may be constrained by the area of pixels 1112, 1114, 1116 and 1118. For example, integration capacitor 1132 and additional component(s) 1134 may be aligned with (e.g. under in an integrated circuit) the corresponding pixel 1112, 1114, 1116 and/or 1118. In some embodiments, components 1132 and 1134 may be in or near the corresponding pixels 1112, 1114, 1116 or 1118. Thus, components 1132 and 1134 may not consume more area than the corresponding pixel 1112, 1114, 1116 and/or 1118. Averaging capacitor 1140 of readout circuit 1130 and cascaded averaging circuits 1150 may be laid out in another manner such that the sizes of averaging capacitor 1140 and cascaded averaging circuits 1150 are not constrained by the areas of pixels 1112, 1114, 1116 and 1118 in the same way as for elements 1132 and 1134. For example, averaging capacitor 1140 and/or cascaded averaging circuits 1150 may be under the first layer of circuitry of ROIC 1120 (e.g. under integration capacitor 1132 and other components 1134) or adjacent to regions containing integration capacitor 1132 and other components 1134.

As indicated in FIG. 10B, integration capacitor 1132 has an area less than the available area corresponding to pixel 1112, 1114, 1116 and/or 1118. Additional components 1134 (if any) may occupy a particular portion of the area corresponding to pixels 1112, 1114, 1116 and/or 1118. The remaining area corresponding to pixels 1112, 1114, 1116 and/or 1118 is the available area. For example, suppose pixels 1112, 1114, 1116 and 1118 have a five micrometer pitch (e.g. are 5 μm×5 μm). If no other components are present, the available area is twenty-five square micrometers. In such a case, integration capacitor 1132 occupies an area that is less than twenty-five square micrometers. In some embodiments, additional components 1134 may include a transistor and/or additional components. Such a transistor might utilize ten square micrometers. For the five micrometer pitch example above, the available area is fifteen square micrometers (twenty-five square micrometers per pixel minus ten micrometers for the transistor). Integration capacitor 1132 thus occupies less than fifteen square micrometers in such cases. In some embodiments, integration capacitor 1132 occupies less than one-half of the available area. In some such embodiments, integration capacitor 1132 occupies not more than one-third of the available area. For example, integration capacitor 1132 might consume not more than one-fourth of the available area. As a result, integration capacitor 1132 has a capacitance, or well capacity, that is less than is allowed by the available area. In the five micrometer pitch/transistor 1134 example above, the available area for integration capacitor 1132 is fifteen square micrometers. This available area corresponds to a capacitance of approximately forty-five fempto-Farads. Thus, integration capacitor 1132 has a capacitance of less than forty-five fempto-Farads in this case. In some embodiments, integration capacitor 1132 has a capacitance of not more than half of the maximum capacitance for the available area (e.g. not more than twenty fempto-Farads for a five micrometer pitch). In some such embodiments, integration capacitor 1132 has a capacitance of not more than one-third of the maximum capacitance for the available area (e.g. not more than fifteen fempto-Farads for a five micrometer pitch). In some such embodiments, integration capacitor 1132 has a capacitance of not more than one quarter of the maximum capacitance for the available area (e.g. not more than twelve fempto-Farads for a five micrometer pitch). In some embodiments, the capacitance of integration capacitor 1132 is less than ten fempto-Farads and at least one fempto-Farad. For example, integration capacitor 1132 might have a capacitance of 6-7 fempto-Farads. Other capacitances are possible in other embodiments, for example based upon the dielectric constant of the insulator used in the capacitor and the area of the capacitor. Integration capacitor 1132 may have an integration time of not more than 1000 microseconds. In some embodiments, the integration time is not more than 500 microseconds. The integration time may be not more than 200 microseconds. For example, the integration time is as low as 100 microseconds or less. Other integration times are possible. Thus, integration capacitor 1132 may consume a smaller area, have a lower capacitance, a shorter integration time and a significantly higher gain.

In some embodiments, ROIC 1120 may be a three-dimensional ROIC. In such embodiments, ROIC 1120 may have multiple layers. In such embodiments, elements of ROIC 1120 may be vertically stacked and interconnected with vias (not shown). In such embodiments, integration capacitor 1132 may have a larger area based on the number of layers of the three-dimensional ROIC. However, the area per layer of such an integration capacitor may still be limited by the size of the corresponding pixel in an analogous manner. Thus, the capacitance of integration capacitor 1132 may be limited by the area of the corresponding pixel 1112, 1114, 1116 and/or 1118. For a single layer ROIC, this limitation may correspond directly to the area of the pixel. For a three-dimensional ROIC, the pixel area still corresponds to a maximum capacitance of integration capacitor 1132. However, maximum capacitance in such a case may be different (e.g. larger than for a single layer ROIC). Thus, integration capacitor 1132 may have an integration capacitance less than the maximum capacitance.

Averaging capacitor 1140 is coupled with integration capacitor 1132, for example through a switch (not shown). Averaging capacitor 1140 periodically receives input from integration capacitor 1132. For example, a signal may be provided from integration capacitor 1132 to averaging capacitor 1140 in response to the expiration of a time interval equal to the integration time. This may be accomplished by the periodic closing of the switch. Averaging capacitor 1140 has a greater capacitance, and thus well size, than integration capacitor 1132. In some embodiments, averaging capacitor 1140 has a capacitance that is at least twice and not more than twenty multiplied by the capacitance of integration capacitor 1132. Other capacitances are possible. Consequently, the charge on integration capacitor 1132 can be periodically provided to averaging capacitor 1140 in time intervals substantially equal to the integration time. For lower integration times, more samplings of integration capacitor 1132 may be provided to averaging capacitor 1140 to improve signal-to-noise ratios.

Averaging capacitor 1140 can provide an averaged signal after multiple samplings of integration capacitor 1132. Thus, averaging capacitor 1140 may be used to reduce noise in a signal provided from integration capacitor 1132. Averaging capacitor 1140 may still be sampled frequently to provide a fast readout. For example, a frame rate generally refers to sensor frame rate. Faster frame rates, which may meet or exceed 500 frames per second. In some embodiments, fast frame rates are at least 1000 frames per second. Such fast frame rate may be used for high maneuvering threats, jitter and smear reduction on moving platforms, and reduction of atmospheric effects. In some embodiments, framing that is above 1000 frames per second may be called "fast framing". In other embodiments, framing that is above 500 frames per second might be termed fast framing. The fast readout from averaging capacitor 1140 is consistent with fast framing in some embodiments. In some embodiments, integration capacitor 1132 can be joined though a switch (not-shown) to capacitor 1140 and only integrated for one integration cycle on the co-joined capacitors. This co-joined capacitor mode also enables very fast framing. In some embodiments greater than 1000 frames per second may be achieved.

IR detection system 1100 may also include one or more cascaded averaging circuits 1150 coupled to a corresponding fast readout circuit 1130. Cascaded averaging circuit(s) 1150 provide additional averaging to the signal from detector 1110. More specifically, cascaded averaging circuit(s) 1150 are coupled to a corresponding averaging capacitor 1140. In some embodiments, each cascaded averaging circuit 1150 includes at least one pair of capacitors arranged in a manner analogous to integration capacitor 1132 and averaging capacitor 1140. Thus, each cascaded averaging circuit 1150 may include an additional integration capacitor (not explicitly shown in FIGS. 10A-10B), an additional averaging capacitor (not explicitly shown in FIGS. 10A-10B) coupled with the additional integration capacitor and a switch coupled between the additional integration capacitor and the additional averaging capacitor. The additional averaging capacitor in the cascaded averaging circuit has an additional averaging capacitance greater than the additional integration capacitance of the additional integration capacitor in the cascaded averaging circuit. In some aspects, cascaded averaging circuit(s) 1150 are coupled to the averaging capacitor through a transistor and/or an amplifier. In other embodiments, an amplifier between cascaded averaging circuit and the averaging capacitor may be omitted. Operation of IR detection system 1100 is analogous to operation of IR detection system 1200, described below.

IR detection system 1100 may have improved performance. Detector 1110 may include smaller pixels (e.g. less than ten micrometers and five micrometers or less in some embodiments). Consequently, benefits such as improved resolution and reduced noise equivalent power (NEP) may be achieved. Further, IR detection system 1100 may address issues resulting from use of smaller pixels 1112, 1114, 1116 and 1118. A low f-number lens 1102 may be used. Using a low f-number (e.g. less than 2 and nominally 1 in some embodiments) for lens 1102 in conjunction with a high gain integration capacitor 1132, averaging capacitor 1140 and cascaded averaging circuit(s) 1150, the low etendue, or light collection efficiency, of small pixels 1112, 1114, 1116 and 1118 can be mitigated. ROIC 1120 may have circuit components allowing for increased gain for small pixels 1112, 1114, 1116 and 1118 while using successive signal averaging stages, such as averaging capacitor 1140 and cascaded averaging circuits 1150. Use of successive/cascaded averaging stages can reduce noise and hence improve noise equivalent power, signal to noise, and detectivity.

The high gain and low integration time (and smaller capacitance) of integration capacitor 1132 may also aid performing fast framing. In some embodiments, frame rates up to and exceeding 1000 frames per second may be supported. Similarly, low integration times, such as two hundred microseconds or less, may be utilized. Thus, multiple closely spaced fast moving events may be imaged on nanosecond or microsecond time scales at long ranges. The data from integration capacitor 1132 can be averaged using averaging capacitor 1140 so that a dim signal can be detected. Cascaded averaging circuit(s) 1150 effectively provides longer integration times and improves dynamic range, signal to noise, and contrast to noise ratio. Each stage of the cascaded averaging circuit 1150 reduces noise further and allows a longer time of integration for small pixels so that the signal to noise of smaller pixel may be equal or better than that of larger pixels. The high gain/low integration time of capacitors 1132 and 1140 in combination with the high effective well capacity of cascaded averaging circuit(s) 1150 allows for fast framing, low noise and high well capacity with a design and layout conducive to a small pixel format. Thus, IR detection system 1100 may reduce integration times, improve signal-to-noise, increase sensitivity, improve contrast, increase dynamic range, provide higher frame rates and improve imaging using smaller pixels 1112, 1114, 1116 and 1118. As a result, target detection, bullet trace back, detection of ultrasonic and hypersonic targets, detection of dim targets, improved resolution of distant targets and other applications may be facilitated.

Figure 11A:
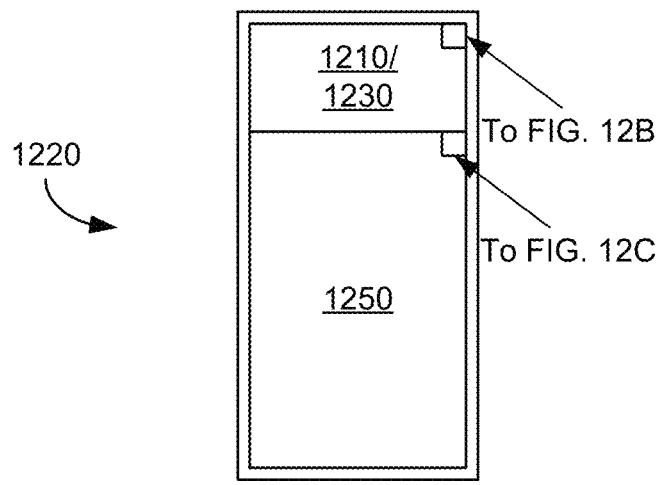
FIGS. 11A-11D depict another embodiment of an infrared detection system.
Figure 11B:
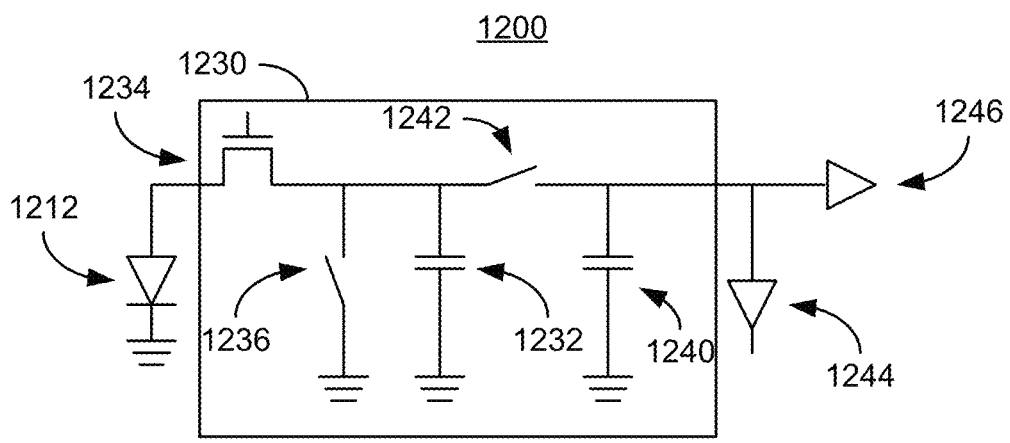
Figure 11C:
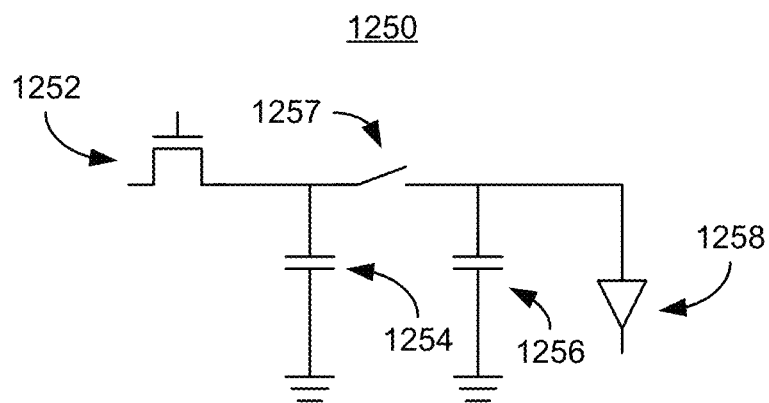
Figure 11D:
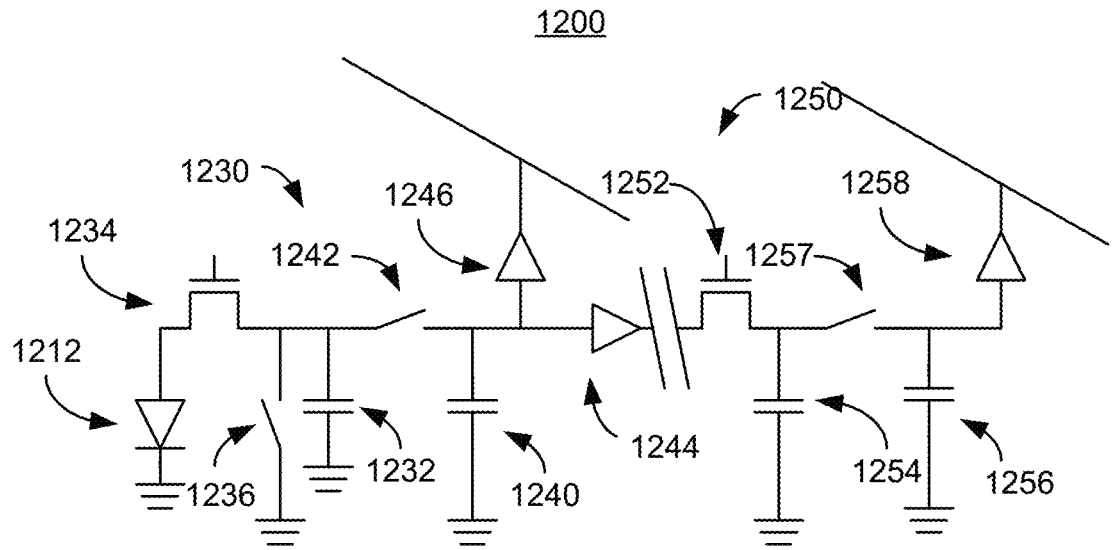

FIGS. 11A-11D depict another embodiment of detection system 1200. For clarity, only some components are shown. In some embodiments, detection system 1200 is an IR detection system. System 1200 is, therefore, described in the context of infrared detection. IR detection system 1200 includes detector 1210 and ROIC 1220. Detector 1210 includes an array of pixels and is analogous to detector 1110. ROIC 1220 that is analogous to ROIC 1120. A lens is not shown. However, a lens analogous to lens 1102 may be used in connection with IR detection system 1200. ROIC 1220 includes fast readout circuitry 1230 and cascaded averaging circuit(s) 1250 that are analogous to readout circuitry 1130 and cascaded averaging circuit(s) 1150, respectively. FIG. 11A depicts an embodiment of the breakout of components 1210, 1220, 1230 and 1250 and is not to scale. FIGS. 11B-11C depict circuit diagrams corresponding to portion of ROIC 1220. FIG. 11D depicts an embodiment of connections for components 1210, 1220, 1230 and 1250. As indicated by FIG. 11A, readout circuitry 1230 may be aligned with (e.g. fabricated under) detector 1210. Detector 1210 includes an array of pixels analogous to detector 1110. Thus, the sizes of the pixels in detector 1210 and areas of components in readout circuit 1230 are analogous to those described above with respect to detector 1110 and readout circuit 1110. In the embodiment shown, cascaded averaging circuit(s) 1250 reside to the side of the detector 1210 and readout circuits 1230. In other embodiments the cascaded averaging circuit(s) 1250 may reside underneath another layer, such as the layer including readout circuits 1230. Switch 1236 can be used as a reset to capacitor 1232 and/or capacitor 1240.

FIGS. 11B-11C are circuit diagrams depicting portions of IR detection system 1200. FIG. 11B depicts pixel 1212 of detector 1210, readout circuit 1230 and amplifiers 1244 and 1246. Pixel 1212 is a photodiode and analogous to one of pixels 1112, 1114, 1115 and 1118. Thus, pixel 1212 may be small, for example less than ten micrometers on a side. In some embodiments, pixel 1212 may be not more than five micrometers on a side. Readout circuit 1230 includes integration capacitor 1232 and transistor 1234 that are analogous to integration capacitor 1132 and component(s) 1134. Thus, integration capacitor 1232 may occupy less than the available area corresponding to detector 1212 and transistor 1234. Integration capacitor 1232 may also have a smaller capacitance. In some embodiments, integration capacitor 1232 has a capacitance that is not more than twenty femto-Farads. Integration capacitor 1232 may have a capacitance that is less than fifteen femto-Farads. In some embodiments, integration capacitor 1232 has a capacitance of at least one fempto-Farad and not more than ten fempto-Farads. In some embodiments, integration capacitor 1232 may have another capacitance. Although not shown in FIG. 11B, transistor 1234 may be biased during operation of IR detection system 1200. For example, slightly reverse biasing pixel/detector 1212 may provide a field such that when the photon hits the detector, the electron-hole pair is provided.

Readout circuit 1230 also includes averaging capacitor 1240 and switches 1236 and 1242. Averaging capacitor 1240 has a capacitance that is generally greater than the capacitance of integration capacitor 1232. For example, averaging capacitor 1240 may have a capacitance that is at least twice and not more than eighty multiplied by the capacitance of integration capacitor 1232. In some such embodiments, averaging capacitor 1240 has a capacitance that it not more than twenty multiplied by the capacitance of integrating capacitor 1232. In some embodiments, one of the amplifiers, such as amplifier 1246, may be used to provide an output from averaging capacitor 1240. The other amplifier, such as amplifier 1244, may provide a connection to cascaded averaging circuit(s) 1250.

An embodiment of cascaded averaging circuit(s) 1250 are depicted in FIG. 11C. In the embodiment shown in FIG. 11C, a single stage, or a single cascaded averaging circuit 1250 is used. In other embodiments, multiple cascaded averaging circuits (e.g. multiple stages) may be utilized.

Cascaded averaging circuit 1250 is analogous to cascaded averaging circuit 1150. Cascaded averaging circuit 1250 is coupled with averaging capacitor 1240 via transistor 1252 and amplifier, such as amplifier 1244. In some embodiments, cascaded averaging circuit(s) 1250 is located to the side of the pixel array of detector 1210 and connected via a multiplexer (not shown). In some embodiments, cascaded averaging circuit 1250 is connected in a three-dimensional stack below the circuitry depicted in FIG. 11B. Other configurations are possible. In some embodiments, the high capacitor density and small design rules may allow for more components in small pixel imager array. Cascaded averaging circuit 1250 may be located nearby to pixel 1212 and associated circuitry depicted in FIG. 11B. Cascaded averaging circuit 1250 includes an additional integration capacitor 1254, additional averaging capacitor 1256, transistor 1252, switch 1257 and amplifier 1258. Signals input to cascaded averaging circuit 1250 via transistor 1252 are integrated onto integration capacitor 1254. After the expiration of a particular time interval, which may be larger than the integration time, switch 1257 is closed and the charge on additional integration capacitor 1254 is provided to additional averaging capacitor 1256. This process may be repeated multiple times. Consequently, additional averaging capacitor 1256 provides averaging of the signals integrated on additional subframe integration capacitor 1254. The averaged signal may be output via amplifier 1258.

FIG. 11D depicts an embodiment of IR detection system 1200 including pixel 1212, readout circuit 1230, cascaded averaging circuit 1250 and associated components. FIG. 11D thus includes a particular arrangement of pixel 1212/detector, readout circuit 1230, averaging circuit 1250, amplifiers 1244, 1246 and 1248 and switches 1242 and 1257 of FIGS. 11A-11C. In the embodiment shown, readout circuit 1230 includes two capacitors 1232 and 1240 and cascaded averaging circuit 1250 includes two capacitors 1254 and 1256. Integrating capacitor 1232, averaging capacitor 1240 and switch 1242 form a high gain input circuit in which current from the photodiode/pixel 1212 flows through the bias controlling direct injection gate 1234. Integrating capacitor 1232 forms a high transimpedance gain circuit whereby the signal and other front end noise sources can undergo a significant gain to allow fast well filling and fast frame rates. However, the noise on the integrating capacitor 1232 also undergoes gain. Averaging capacitor 1240 provides some noise reduction. Cascaded averaging circuit 1250 allows the high transimpedance with short integration times, but also provides for successively averaging the signal and noise from pixel 1212 and the remainder of IR detection system 1200. Thus, the lower photon flux signal for smaller pixel 1212 is not dominated by the noise after cascaded signal averaging.

Readout circuit 1230 provides integration of the signal from pixel 1212. Readout circuit 1230 also allows imaging of targets moving more quickly due to the short integration time for integration capacitor 1232. More specifically, signals from pixel 1212 are integrated on integration capacitor 1232 during an integration time. The integration time may be in the ranges described above. For example, the integration time may be two hundred microseconds or less in some embodiments. In addition to allowing for a short integration time for integration capacitor 1232, capacitor 1240 allows for averaging of the signal provided from pixel 1212. More specifically, after the expiration of the integration time, the charge on integration capacitor 1232 is provided to averaging capacitor 1240. This may be achieved by closing switch 1242. This procedure may be carried out for multiple cycles, with each cycle corresponding to an integration time. Thus, averaging capacitor 1240 may provide averaging of the signal from integration capacitor 1232. In some embodiments, readout circuit 1230 may reduce the noise on the signal from integration capacitor 1232 by a factor of approximately two through five. Thus, a fast readout, for example that may be suitable for fast framing described above, may be provided while allowing for some noise reduction by averaging capacitor 1240. A readout may be performed via amplifier 1246, while amplifier 1244 provides signals to cascaded averaging circuit 1250.

Cascaded averaging circuit 1250 provides additional averaging. Thus, averaging is cascaded through two sets of capacitors (1232/1240 and 1254/1256) if cascaded averaging circuit 1250 is used. Cascaded averaging circuit 1250 includes additional integration capacitor 1254, additional averaging capacitor 1256 and switch 1257. The capacitance of averaging capacitor 1256 is greater than the capacitance of integration capacitor 1254. In some embodiments, the capacitance of averaging capacitor 1256 is at least two and not more than twenty multiplied by the capacitance of integration capacitor 1254.

Cascaded averaging circuit 1250 reduces the noise over the signal provided by averaging capacitor 1240. Cascaded averaging circuit 1250 functions in a manner analogous to readout circuit 1230. More specifically, after the expiration of a particular time or a particular number of integrations of integration capacitor 1232, the charge on averaging capacitor 1240 is provided to additional integration capacitor 1254. This process is repeated a number of times. The charge on additional integration capacitor 1254 is shared via the switch 1257 with additional averaging capacitor 1256. This may be achieved by closing switch 1257. This procedure may be carried out for multiple cycles. Thus, additional averaging capacitor 1256 may provide averaging of the signal from additional integration capacitor 1254. For example, cascaded averaging circuit 1250 may reduce the noise on the averaging capacitor 1240 by about a factor of at least two and not more than five in some embodiments. In some embodiments, the sum of the capacitances of integration capacitor 1232 and averaging capacitor 1240 is greater than two fempto-Farads. In some embodiments, the sum of the capacitances of integration capacitor 1232 and averaging capacitor 1240 is greater than ten fempto-Farads. Similarly, in some embodiments, the sum of the capacitances of additional integration capacitor 1254 and additional averaging capacitor 1256 is greater than two fempto-Farads. In some embodiments, the sum of the capacitances of additional integration capacitor 1254 and additional averaging capacitor 1256 is greater than ten fempto-Farads. For example, capacitor 1254 may be at least one fempto-Farad and not more than ten fempto-Farads in some embodiments. In some embodiments, capacitor 1256 may have a capacitance of at least two fempto-Farads and not more than fifty fempto-Farads. In some embodiments, amplifier 1244 and capacitor 1254 may be omitted, for example if there is low enough interconnection capacitance from capacitor 1240 to capacitor 1256.

Capacitors 1232 and 1240 and transistor 1234 of readout circuit 1230 function in an analogous manner to capacitors 1254 and 1256 and transistor 1252 of cascaded averaging circuit 1250. Readout circuit 1230 and cascaded averaging circuit 1250 may also function together. Suppose averaging capacitor 1240 is averaged for $K_1$ cycles, while averaging capacitor 1256 is averaged for $K_2$ cycles. Thus, each of the $K_2$ cycles includes $K_1$ averages of averaging capacitor 1240. In operation, integration capacitor 1232 is charged while switches 1236 and 242 are open. Periodically, upon the expiration of time intervals equal to the integration time, switch 1242 is closed and the charge from integration capacitor 1232 is provided to averaging capacitor 1240. This occurs $K_1$ times. This more rapidly changing, averaged (fast frame) signal may be read onto the line coupled with amplifier 1246. The signal from averaging capacitor 1240 is also provided via amplifier 1244 and transistor 1252 to additional integration capacitor 1254. Additional integration capacitor 1254 thus receives a signal that has been averaged a $K_1$ times through averaging capacitor 1240. Switch 1257 is periodically closed to allow charge from additional integration capacitor 1254 to be provided to additional averaging capacitor 1256. This occurs $K_2$ times. The signal from additional averaging capacitor 1256 may be read out on the line coupled with amplifier 1258. These operations repeat cyclically. Thus, a faster averaged signal may be output from averaging capacitor 1240, while a lower noise, further averaged signal may be output from additional averaging capacitor 1256. As a result, IR detection system 1200 may have similar benefits as IR detection system 1100. Thus, target detection, bullet trace back, detection of ultrasonic and hypersonic targets, detection of dim targets, improved resolution of distant targets and other applications may be facilitated.

Figure 12:
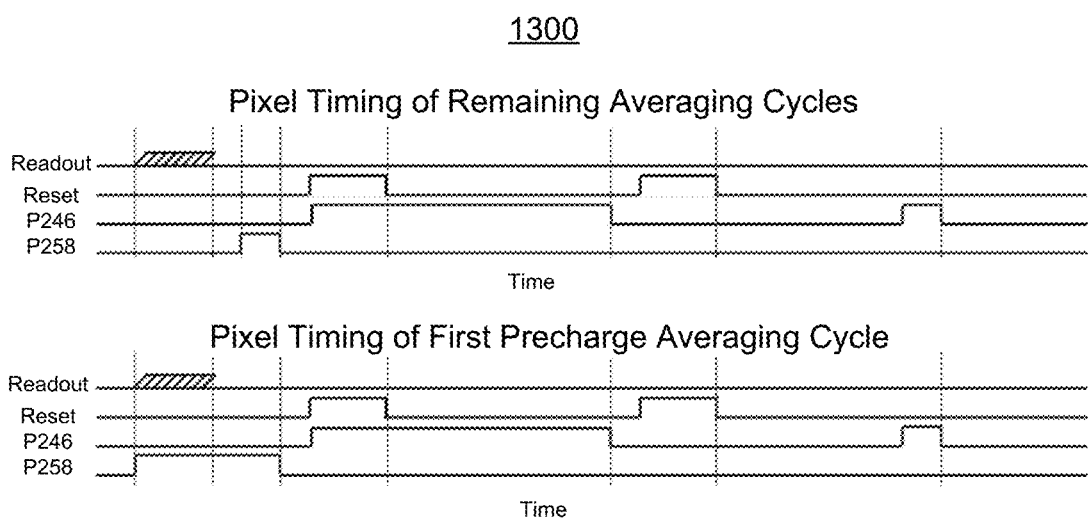
FIG. 12 depicts an embodiment of timing usable for an infrared detection system including a cascaded averaging circuit.

In some embodiments, precharging may be utilized. FIG. 12 depicts an embodiment of timing 1300 usable for an IR detection system including a cascaded averaging circuit, such as integration detection system 1200. Thus, timing 1300 is described in the context of infrared detection system 1200. In other embodiments, other timing may be used. Operation of infrared detection system 1200 with precharging may be explained utilizing timing 1300 as follows. As in the example above, averaging capacitor 1240 is averaged for $K_1$ cycles, while averaging capacitor 1256 is averaged for $K_2$ cycles. Thus, each of the $K_2$ cycles includes $K_1$ averages of averaging capacitor 1240. Also, in some embodiments, the clock used in timing the IR detection system may be selected to be a multiple of the sampling rate. Selecting a clock cycle that is greater than the sampling rate (e.g. the multiple of the sampling rate) may mitigate noise.

A timing cycle beings during readout of the previously completed frame's signals through amplifier 1246 (e.g. for a fast frame reading) and/or through amplifier 1258 (for a lower noise readout) onto corresponding columns lines. During this read period, additional averaging capacitor 1256 may be precharged. In addition, the averaged, integrated signal may be sampled from averaging capacitor 1240 onto additional integration capacitor 1254 through amplifier 1244. This readout is accomplished by holding switch 1257 closed during readout row selection. For the next $K_2-1$ frames out of $K_2$ frames of total cascaded averaging cycles, switch 1257 is closed only after each readout of averaging capacitor 1240 is completed. At this time additional averaging capacitor 1256 has a lower noise copy of the charge accrued by averaging capacitor 1240. Momentarily closing switch 1257 thus performs the cascaded averaging operation from capacitor 1254 onto capacitor 1256.

Between each readout period for cascaded averaging circuit 1250, readout circuit 1230 is performing a similar precharge and averaging function for $K_1$ cycles. Photodiode/pixel 1212 produces a photo signal that is integrated onto integration capacitor 1232 in response to conditions set by bias transistor 1234 and the photo signal. The period of integration is defined as the time between switch 1236 opening and switch 1242 opening in sequence. Switch 1236 is momentarily closed at the beginning of each integration cycle to empty integration capacitor 1232. Switch 1242 and switch 1257 are closed for the first cycle out of $K_1$ total integration averaging cycles in order to empty averaging capacitor 1240. In such an embodiment, $K_1$ is an integer selected to provide the desired amount of averaging. Further, for the first cycle switch 1236 is opened while switch 1242 remains closed for an extended period. Thus, averaging capacitor 1240 is precharged to a voltage close to the expected final value. Averaging capacitor 1240 may not be reset because the previous integrated voltage on averaging capacitor 1240 is typically near the final value. Not resetting and/or precharging averaging capacitor 1240 may allow faster noise settling rate and hence faster frame rates. During the next $K_1-1$ cycles switch 1242 is closed momentarily at the end of each integration period to perform the averaging operation from capacitor 1232 onto capacitor 1240.

Precharging aids in presettling the signal, for example were motion or scene changes are significant. However, in some embodiments, not resetting averaging capacitor 1240 may have an improved effect because precharging has uniformities imposed by capacitor variation and integration time adjustments. During motion of system 1200 or of targets, additional techniques to reduce blur and improve frame rate can also be utilized. Precharging allows the pixel voltage to settle closer to the new dynamically changing flux values. The ability to precharge averaging capacitor 1240 to close to its final value allows more rapid reduction of the noise on the circuits 1230 and 1250. This allows a faster frame rate out each stage of ROIC 1220. However, system 1200 can operate both utilizing precharging and without utilizing precharging. In some embodiments, the input circuit to integration capacitor 1232 may be a CTIA, buffered direct injection, source follower or other variant of input circuit. In such embodiments, averaging by capacitor 1240 and cascaded averaging circuit 1250 may still reduce noise.

Readout circuit 1230 and cascaded averaging circuit 1250 each has a settling time associated with both the noise and the ratio of the capacitance of the averaging capacitor 1240 or 1256 to the integration capacitor 1232 and 1240. In other words, the averaging capacitance divided by the integration capacitance affects the settling time for readout circuit 1230 and cascaded averaging circuit 1250. The settling time may be reduced using precharging. If IR detection system 1200 is desired to operate at high frame rate to reduce or prevent smear due to high platform motion, a small ratio of the averaging capacitance(s) to the integration capacitance(s) may be used. For slower more stationary imagery, such a fixed mounting or slow movements, a larger ratio of the averaging capacitance(s) to the integration capacitance(s) can be chosen. In some embodiment, the ratio of the capacitances of integration capacitor 1232 to averaging capacitor 1240 may be selected to match the flux of a lens, such as lens 1102, used with system 1200. In some embodiments, multiple capacitors can be utilized in place of single capacitors for the readout circuit 1230 and/or cascaded averaging circuit 1250. In such an embodiment, capacitor(s) may be selectively switched into a variable gain mode to allow a variable ratio of averaging capacitance(s) to integration capacitance(s). Even if signals are not fully settled before a particular number of integrations, system 1200 may still be utilized.

In some embodiments the fast frame output can be read from amplifier 1246 at the end of any number of cycles. Reading from amplifier 1246 may allow for adaptation to target speed while minimizing smear. In some embodiments, the output of amplifier 1246 can be used for simultaneous high dynamic range frames extending the upper level of dynamic range with periodic integration onto both the integration capacitor 1232 and averaging capacitor 1240 by keeping switch 1242 closed during a shorter integration time. For example, if $K_1=10$ fast frame cycles (number of integrations for integration capacitor 1232 before sampling) and $K_2=10$ cycles (number of integrations of integration capacitor 1254 before sampling), every full integrate cycle ($K_2$ cycles completed) corresponds to one hundred fast frame cycles. For high dynamic range if the integration time is reduced by a factor ten, then the total dynamic flux range is increased by a factor of ten for the shorter integration time. Thus, every one hundred cycles can have a high dynamic range integration inserted, with an integration time that is reduced by a factor of ten. In such an embodiment, the amount of additional high end dynamic range comes at a cost of just more than $1/1000^{th}$ additional time of integration within the $K_1$ and $K_2$ cycles. In some embodiments, this extends the dynamic range. The dual channel output (through amplifiers 1246 and 1258) make this readout possible. The high dynamic range settings may be cued by the output of additional averaging capacitor 1256.

In some embodiments, $K_1$ (the number of fast fame cycles/averages for fast readout circuit 123), $K_2$ (the number of cycles/averages for cascaded averaging circuit 1230), and/or integration times (e.g. operation switches 1242 and 1257) may be set dynamically. Thus, $K_1$ and $K_2$ may be selected to account for different motion conditions in such embodiments. For stationary imaging, with low expected motion, typically $K_1$ and $K_2$ may each be between 6-20 cycles. For motion, the $K_1$ and $K_2$ cycles may be shortened progressively to mitigate smear and blurring.

Use of readout circuit 1230 in conjunction with cascaded averaging circuit 1250 may greatly increase effective well capacity, allow the sensitivity for smaller pixels 1212 to approach and exceed that of larger pixels, provide higher resolution, improve national image interpretability rating scale (NIIRS), enhance contrast and improve minimum resolvable temperature difference (MRTD). For example, ROIC 1220 may allow both medium and small pixel sensors to achieve short integration times enabling framing rates in excess of 1000 FPS. In an embodiment where averaging capacitor 1240 is not reset, the output from averaging capacitor 1240 may achieve the sensitivity of a sensor with a much longer integration time without the added area requirement of a larger capacitor. For example by not resetting capacitor 1240 the noise on the output capacitor 1240 may settle over several milliseconds of averaging to a minimum noise floor. Although not shown, a lens having a low f-number analogous to lens 1102 may be utilized.

Cascaded averaging circuit 1250 may use much smaller capacitors and still achieve significant noise reduction. For example, a capacitance ratio of the additional integration capacitance of additional integration capacitor 1254 to the additional averaging capacitance of additional averaging capacitor 1256 of 8/80 may provide the same performance as a capacitance ratio of 2/20 in noise reduction while consuming only one-fourth the area. If a smaller set of capacitors is selected, the capacitor size is chosen to not increase the KTC noise associated with smaller capacitors. This lower area utilization allows multiple cascades of averaging in the pixel 1212 or nearby the pixel 1212 creating a very compact and highly effective noise averaging mechanism.

In some embodiments, high dynamic range (HDR) can be accomplished by using the dual outputs from amplifiers 1246 and 1258 sequentially. In such embodiments, operation of IR detection system 1200 may differ. For using HDR frame timing, one out of N frames may be utilized as follows. Averaging capacitor 1240 is reset with integration capacitor 1232 by closing switch 1236 before HDR integration begins. The readout circuit 1230 is configured with switch 1242 held closed during integration. When switch 1242 is closed during integration, the input capacitance is the sum of the capacitances of integration capacitor 1232 and averaging capacitor 1240. In some embodiments, this may be approximately nine multiplied by the integration capacitance of integration capacitor 1232. A very short integration time for very high flux signal capture is used (typically a few microseconds or less) may also be used. Pixel 1212 from amplifier 1246 are read out but are not mirrored over cascaded averaging circuit 1250. Averaging capacitor 1240 is reset with integration capacitor 1232 by momentarily closing switch 1236 after HDR integration ends and pixels are read out. Reset of the readout circuit 1230 after the HDR cycle prevents signals from the HDR cycle from mixing with the low dynamic range (LDR) signal cycles. For the remainder of frames 2 though N, normal operation is utilized for readout circuit 1230 and cascaded averaging circuit 1250. This may achieve LDR for normal background flux, in a manner described in the timing for FIG. 11D. Optional precharging of averaging capacitors 1240 and 1256 may be employed is based upon the required settling time and speed of targets and movement of the sensing platform. LDR signals may be read out from amplifier 1246 and/or amplifier 1258 following each cycle, depending on speed of targets and movement of the sensing platform. In another embodiment the HDR frame may be accomplished nearly simultaneously while maintaining LDR cycles in all N frames, by adding an independent HDR fast frame circuit that does not require the use of one of the normal or LDR averaging cycle frames.

Figure 13:
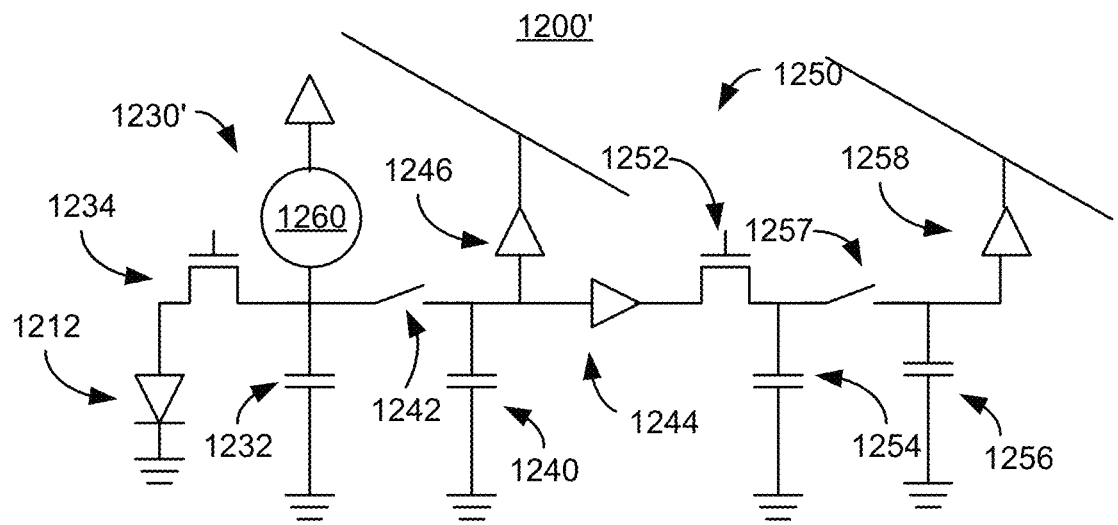
FIG. 13 depicts another embodiment of an infrared detection system including a cascaded averaging circuit and charge skimming.

FIG. 13 depicts another embodiment of IR detection system 1200' including charge skimming. IR detection system 1200' is analogous to IR detection system 1200 and thus includes analogous components and may have analogous benefits. In addition, readout circuit 1230' includes charge skimming module 1260. Charge skimming can be utilized to remove background charge. IR detection system 1200' also allows detectors, such as detector 1210 having pixel 1212, to work at higher dark current (Idark). Charge skimming in connection with multiple averages carried out in circuits 1230 and 1250 may achieve an improvement signal to noise. In some embodiments, this improvement may be by factor greater than nine. In some such embodiments, the improvement may be by a factor of greater than sixteen. Charge skimming of various types may be used to effectively subtract the excess dark current off of leaky detectors. IR detection system 1200', which utilizes small pixels 1212 and multiple averages in circuits 1230 and 1250, charge skimming allows for a higher dark current detector with precision charge skimming. Consequently, improvements in signal to noise levels may be obtained.

Charge skimming module 1260 may be a programmable current source, a switched capacitor charge subtraction, a resistive constant current connected to a voltage source, and/or other mechanism that may provide global or pixel by pixel current removal or skimming. Several methods may be deployed to accurately subtract off excess current that may be injected at the input node due to high excess dark current. In some embodiments, excess noise and residual fixed pattern noise may remain when utilizing charge skimming module 1260. The excess fixed pattern noise after charge skimming can be reduced to near the temporal noise floor. For example, a Scene Based Non Uniformity Correction (SBNUC) may reduce such noise. SBNUC running on output video from amplifier 1258 may in some embodiments reduce spatial noise by greater than a factor of sixty-four with three or more average capacitors (e.g. an additional cascaded averaging circuit not shown in FIG. 13). The use of the SBNUC may reduce the fixed pattern noise associated with drift, dark current changes, and 1/f noise. Moreover, IR detection system 1200' may allow for near room temperature detectors in some embodiments. For example, even if the dark current is significantly greater than the photocurrent from pixel 1212, the increase in the photocurrent induced shot noise may still be mitigated by readout circuit 1230 and cascaded averaging circuit 1250 of IR detection system 1200'.

Figure 14:
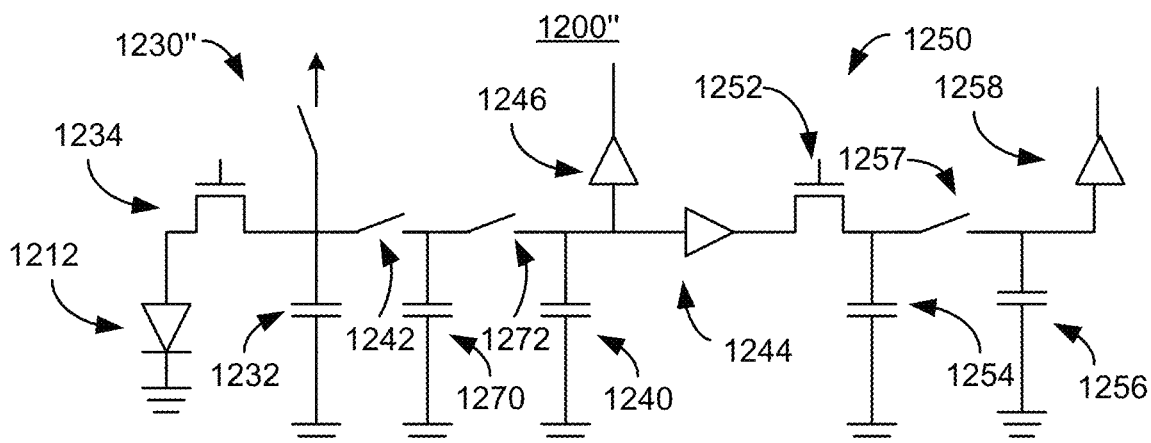
FIG. 14 depicts another embodiment of an infrared detection system including a cascaded averaging circuit and additional capacitors.

FIG. 14 depicts another embodiment of IR detection system 1200" including a cascaded averaging circuit and an additional capacitor. IR detection system 1200" is analogous to IR detection system 1200 and thus includes analogous components and may have analogous benefits. In addition, readout circuit 1230" includes an additional capacitor 1270 and corresponding switch 1272. Thus, readout circuit 1230' is a three capacitor readout circuit instead of a two capacitor readout circuit. Stated differently, instead of a single averaging capacitor 1240, two capacitors 1240 and 1270 are used. For IR detection system 1200", the first integration prior to noise averaging occurs on capacitors 1232 and 1270 together with switch 1242 closed. Integrating on capacitors 1232 and 1270 with switch 1242 closed and switch 1257 open allows the combined transimpedance gain to depend upon both capacitors 1232 and 1270 (e.g. $Z=q/(C_{apacitor\ 1232}+C_{apacitor\ 1270})$. For averaging, switch 1242 is opened and switch 1272 closed. Averaging occurs on the signal between capacitors 1232 and 1270. The integration-then-average process is repeated N times where multiple integration signals on capacitors 1232 and 1270 are then shared from capacitor 1270 to averaging capacitor 1240. Cascaded averaging circuit 1250 is analogous to and operates in an analogous manner to that described above. In other embodiments, cascaded averaging circuit 1250 might include three capacitors. In general, other numbers of capacitors can be used in readout circuit 1230 and/or cascaded averaging circuit 1250.

Readout at amplifier 1246 allows a higher effective well capacity for readout circuit 1230". However, in some embodiments this may be at the expense of a slower frame time (e.g. time to complete $K_1$ cycles). For example, in some embodiments, the frame time may exceed 1 millisecond. Thus, reducing smearing in highly dynamic vibration and moving targets may be more challenging. In some cases, the three capacitor circuit of 1230" can provide improved sensitivity at the expense of slower total averaged integration time. As discussed above, smaller capacitances having the same capacitance ratio may be used in cascaded averaging circuit 1250 while achieving analogous noise reduction.

Figure 15:
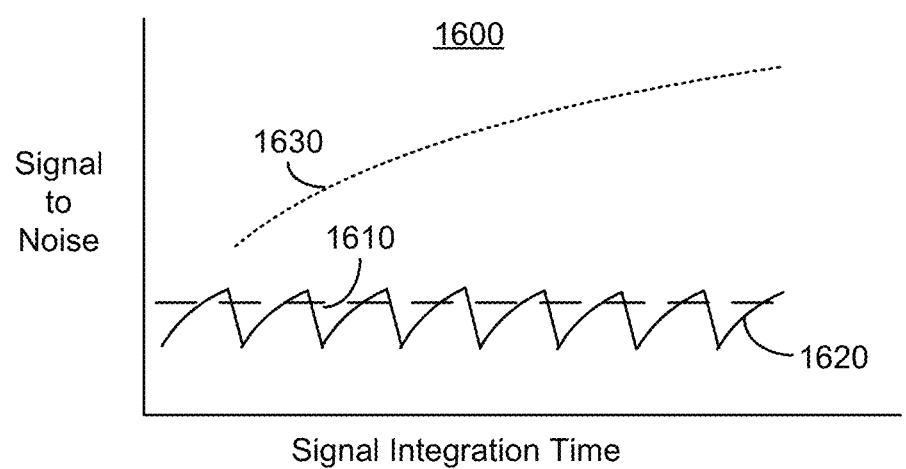
FIG. 15 is a graph illustrating exemplary evolution of noise reduction in an embodiment of an infrared detection system including a cascaded averaging circuit.

FIG. 15 is a graph 1600 illustrating exemplary evolution of noise reduction in an embodiment of an infrared detection system including a cascaded averaging circuit and utilizing small pixels. Thus, FIG. 15 is discussed in the context of IR detection system 1200. Dashed line 1610 indicates the signal to noise ratio with a single capacitor (not shown). Solid line 1620 indicates the single-to-noise for signals output on amplifier 1246, after averaging by capacitor 1240. Dotted line 1630 indicates the signal-to-noise for signals output on amplifier 1258, after averaging by capacitors 1240 and 1256. This signal to noise improvement occurs when the reset is applied to 1240 each full frame. Thus, a noise improvement may be provided for signals output on amplifier 1246. However, a significant improvement may be achieved for signals provided from averaging capacitor 1256.

Figure 16:
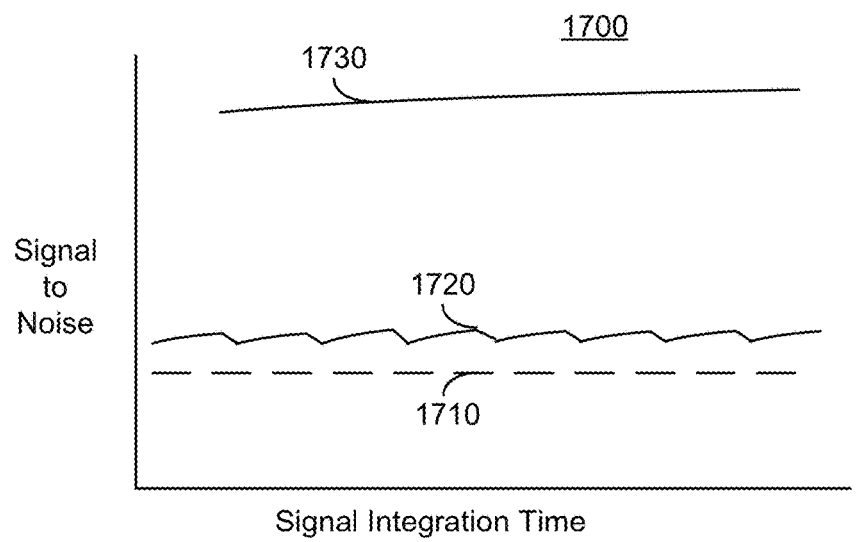
FIG. 16 is a graph illustrating exemplary signal-to-noise ratios for an infrared detection system including a cascaded averaging circuit versus other infrared detection systems.

FIG. 16 is a graph 1700 illustrating exemplary signal-to-noise ratios for an IR system including a cascaded averaging circuit when the capacitor 1240 is not reset each frame. Thus, FIG. 16 is discussed in the context of IR detection system 1200. Dashed line 1710 indicates the signal to noise ratio with a single capacitor (not shown). Solid line 1720 indicates the single-to-noise for signals output on amplifier 1246, after averaging by capacitor 1240. Dotted line 1730 indicates the signal-to-noise for signals output on amplifier 1258, after averaging by capacitors 1240 and 1256. Thus, as IR detection system 1200 continues to average down noise over many frames or many milliseconds when averaging capacitor 1240 is not reset each frame read, further settled noise improvements may be achieved. Not resetting averaging capacitors allows achieving low noise for pixels which average continuously over frame boundaries in the scene where the pixels have very little incident power change over several frames. The noise reduction by each stage of IR detection system 1200 varies when the sensor is moving with respect to the targets. The most dynamic conditions of varying scene flux may require "presetting" the signal values with the first averaged frame in an averaging sequence. These conditions may also allow a very low noise floor for pixels in scenes which have very little incident power change. However, the multiple averages in the circuits 1230 and 1250, allows the noise to settle to the lower level. Thus, as previously indicated, IR detection system 1200 may provide lower noise levels.

Figure 17:
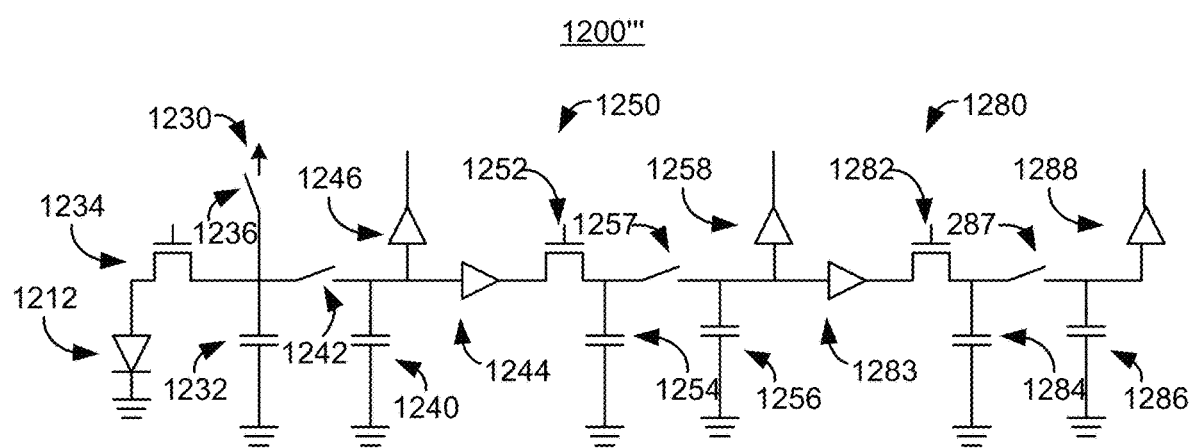
FIG. 17 depicts another embodiment of an infrared detection system including multiple cascaded averaging circuits.

FIG. 17 depicts another embodiment of IR detection system 1200''' including multiple cascaded averaging circuits. IR detection system 1200''' is analogous to IR detection system 1200 and thus includes analogous components and may have analogous benefits. In addition, IR detection system 1200''' includes a second cascaded averaging circuit 1280. Cascaded averaging circuit 1280 includes transistor 1282, input amplifier 1283, integration capacitor 1284, averaging capacitor 1286, switch 1287 and output amplifier 1288. Cascaded averaging circuit 1280 is analogous to cascaded averaging circuit 1250 and operates in a similar manner. Thus, more than two stages of averaging capacitors may be used in an IR detection system. The additional stage(s), such as cascaded averaging circuit 1280, may be utilized for additional noise averaging. In some embodiments, the input to each successive stage is driven and may settle in less than one microsecond. Consequently, multiple stages may be used for achieving even faster frame rates at the input to the pixel. Multiple stages might also be used to drive down noise, for example from very high leakage detectors. Because of the compactness, a three or more stage cascade FPA detection system, such as IR detection system 1200''' may be developed for smaller pixel. Because of the compactness and multiplexing, all the components may reside near the pixel.

IR detection system 1200''' may include a first very high gain state integration readout circuit 1230, followed by the first cascaded averaging circuit 1250 and then second cascaded averaging circuit 1280. Transistors 1252 and 1282 may act as the access switches or multiplexers to time the signal averaging with the proper cells during scanning of the inputs/outputs of each stage of IR detection system 1200'''. Cascaded averaging circuit 1280 uses integration capacitor 1284 and averaging capacitor 1286. Switch 1287 allows integration capacitor 1284 to average onto averaging capacitor 1286. The outputs via amplifiers 1246, 1258 and 1288 may have dedicated multiplexed outputs, may have 2 outputs which are switched or shared, or may have one output that is switched or multiplexed. Thus, analogous benefits to those described above may be provided by IR detection system 1200'''.

Figure 18:
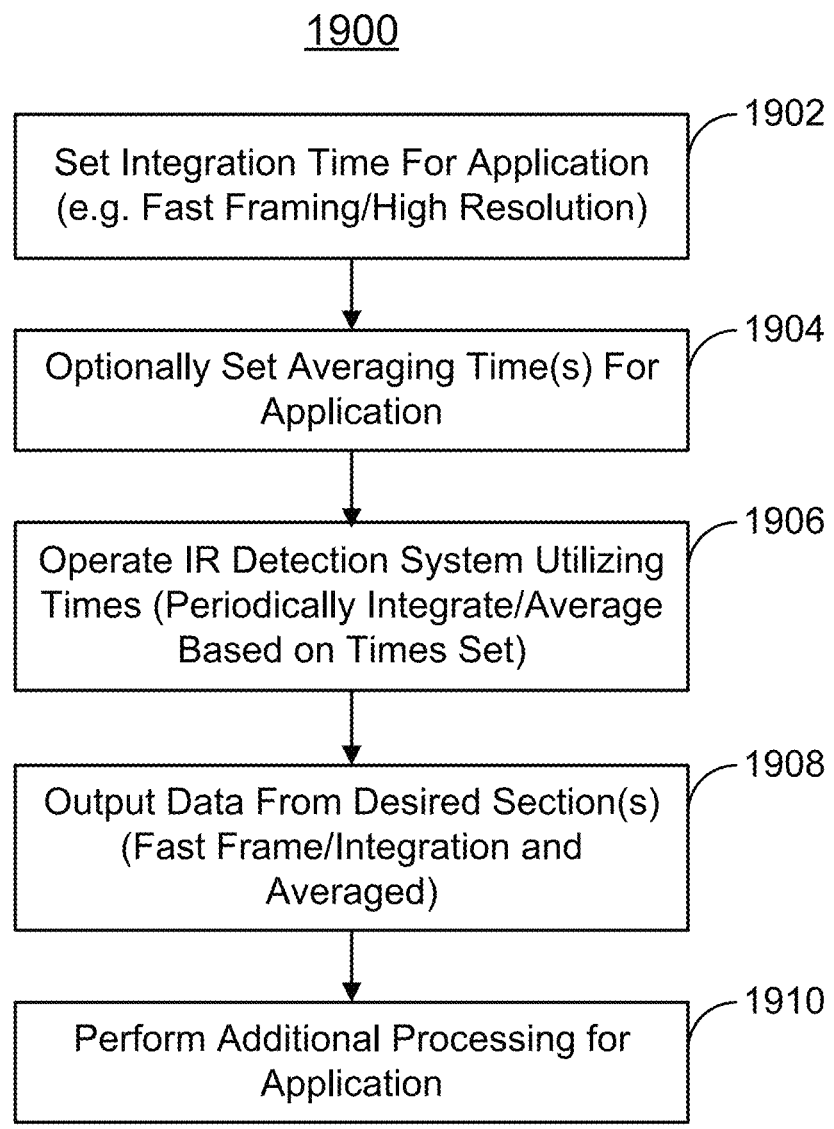
FIG. 18 is a flow chart depicting an embodiment of a method for utilizing an infrared detection system.

FIG. 18 is a flow chart depicting an embodiment of method 1900 for utilizing an infrared detection system. Method 1900 may include substeps. In addition, in some embodiments, steps and/or substeps may be performed in another order, including in parallel. Further, although described in the context of single pixel, method 1900 may extended to multiple pixels in a detector array. For example, the pixels in the detector may be raster scanned, portions method 1900 may be carried out for each pixel and the output used to provide a video readout or still image.

The integration time for a readout of a pixel is set, at 1902. The integration time selected may be based upon the size of the integration capacitor, light background, collection optics, as well as other factors such as whether fast framing and/or high resolution are desired for the pixel. For example, if a bright source is sensed in the image being captured, the integration time may be adaptively reduced or increased to provide an unsmeared representation of the image and readout to an external processor. For example, in some embodiments, integration times of 200 microseconds or less may be set at 1902. Integration times of one hundred microseconds or less may be used in some cases. In some embodiments, the number of cycles for which integration is carried out (e.g. $K_1$) is also set at 1902. The number of cycles may increase with decreasing integration time. Thus, the frequency at which the charge at the integration capacitor is provided to the averaging capacitor of a readout circuit is determined at 1902.

In some embodiments, the number of averaging cycles and total averaging time(s) are set at 1904. The averaging time corresponds to the number of integration cycles that are averaged by cascading averaging circuit(s). For multiple cascaded averaging circuits, multiple averaging times may be set at 1904. Thus, the frequency at which the charge at an averaging capacitor of a particular circuit is provided to the integration capacitor of a next circuit is determined at 1904.

The IR detection system is operated using the integration times and averaging times, at 1906. Thus, the signal from the pixel(s) are provided to the corresponding readout circuit, the signal at the integration capacitor is provided to the averaging capacitor, the signal at the averaging capacitor is provided to a subsequent stage, and the output of the averaging capacitor(s) is read at 1906. In some embodiments, 1906 may include precharging one or more of the capacitors used.

In addition, data are output from the desired sections of the IR detection system, at 1908. For example, the averaging capacitor for the readout circuit and/or the averaging capacitor(s) for cascaded averaging circuit(s) may be sampled at 1908. This sampling may occur at different frequencies for different outputs. Thus, both faster readout and lower noise/further averaged signals may be output depending on which tap(s) of video from circuit is selected. Additional processing of the output signal may be performed, at 1910. This processing may depend upon the application for which the IR detection system is used. Thus, using method 1900, the benefits of the IR detection systems described herein may be realized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
setting an integration time for a readout circuit of a plurality of readout circuits based on a speed of a target desired to be captured in a fast frame image, the plurality of readout circuits configured to read a plurality of pixels in an image detector, the plurality of pixels having a pitch of less than ten micrometers, the integration time being not more than five hundred microseconds, the integration time corresponding to a subframe of the fast frame image, wherein the integration time is based on a dwell time of the target in a pixel of the plurality of pixels, and wherein the setting the integration time further includes:
setting the integration time to be not more than twenty multiplied by the dwell time;
performing a plurality of integrations of each readout circuit based on the integration time to provide a plurality of subframes; and
averaging a number of the plurality of the subframes to provide the fast frame image.

2. The method of claim 1, further comprising:
setting the plurality of readout circuits to retain a memory over at least a portion of the plurality of subframes.

3. A method, comprising:
setting an integration time for a readout circuit of a plurality of readout circuits based on a speed of a target desired to be captured in a fast frame image, the plurality of readout circuits configured to read a plurality of pixels in an image detector, the plurality of pixels having a pitch of less than ten micrometers, the integration time being not more than five hundred microseconds, the integration time corresponding to a subframe of the fast frame image, wherein the readout circuit of the plurality of readout circuits includes an integration capacitor and an averaging capacitor, the integration capacitor being coupled with a pixel of the plurality of pixels, the pixel having a pixel area, an available area less than the pixel area being usable for layout of the integration capacitor, the integration capacitor having a capacitor area less than the available area, the integration capacitor having an integration capacitance;
performing a plurality of integrations of each readout circuit based on the integration time to provide a plurality of subframes; and
averaging a number of the plurality of the subframes to provide the fast frame image.

4. The method of claim 3, wherein the averaging capacitor has an averaging capacitance greater than the integration capacitance.

5. A method, comprising:
setting an integration time for a readout circuit of a plurality of readout circuits based on a speed of a target desired to be captured in a fast frame image, the plurality of readout circuits configured to read a plurality of pixels in an image detector, the plurality of pixels having a pitch of less than ten micrometers, the integration time being not more than five hundred microseconds, the integration time corresponding to a subframe of the fast frame image, wherein the fast frame image includes a plurality of target-like features;

performing a plurality of integrations of each readout circuit based on the integration time to provide a plurality of subframes;
averaging a number of the plurality of the subframes to provide the fast frame image;
filtering a plurality of image features to exclude a portion of the plurality of target-like features inconsistent with a plurality of target thresholds;
preprocessing the plurality of target-like features to provide a plurality of continuous target-like features;
statistically analyzing the plurality of continuous target-like features based on a geometry of each of the plurality of continuous target-like features; and
removing a portion of the plurality of continuous target-like features based on at least one of size, shape and distance to provide a plurality of target candidates.

6. The method of claim 5, further comprising:
repeating the performing the plurality of integrations and averaging for a plurality of iterations to provide a plurality of fast frame images;
repeating the filtering, preprocessing, statistically analyzing and removing for the plurality of fast frame images to provide an additional plurality of target candidates for each of the plurality of fast frame images; and
comparing the plurality of target candidates for the fast frame image and the additional plurality of target candidates for the each of the plurality of fast frame images to identify a target signature based on distance between the plurality of target candidates and each of the additional plurality of target candidates.

7. A system, comprising:
a plurality of readout circuits having an integration time, the integration time being changeable and set based on a speed of a target desired to be captured in a fast frame image, the plurality of readout circuits configured to read a plurality of pixels in an image detector, the plurality of pixels having a pitch of less than ten micrometers, the integration time being not more than five hundred microseconds, the integration time corresponding to a subframe of the fast frame image, each of the plurality of readout circuits further comprising
an integrator configured to perform a plurality of integrations based on the integration time to provide a plurality of subframes; and
an averager coupled to the integrator and configured to average a number of the plurality of the subframes to provide the fast frame image, the target being resolvable in the fast frame image, wherein the integrator includes an integration capacitor and the averager includes an averaging capacitor, the integration capacitor being coupled with a pixel of the plurality of pixels, the pixel having a pixel area, an available area less than the pixel area being usable for layout of the integration capacitor, the integration capacitor having a capacitor area less than the available area, the integration capacitor having an integration capacitance.

8. The system of claim 7, wherein the integration time is based on a dwell time of the target in a pixel of the plurality of pixels.

9. The system of claim 7, wherein the averaging capacitor has an averaging capacitance greater than the integration capacitance.

10. The system of claim 7, wherein the integrator is configured to repeat the plurality of integrations and wherein the averager is configured to average for a plurality of iterations to provide a plurality of fast frame images, the system further comprising:
a combiner configured to provide a combined frame including the plurality of fast frame images.

11. The system of claim 7, wherein the plurality of readout circuits are configured to retain a memory over at least a portion of the plurality of subframes.

12. A system, comprising:
a plurality of readout circuits having an integration time, the integration time being changeable and set based on a speed of a target desired to be captured in a fast frame image, the plurality of readout circuits configured to read a plurality of pixels in an image detector, the plurality of pixels having a pitch of less than ten micrometers, the integration time being not more than five hundred microseconds, the integration time corresponding to a subframe of the fast frame image, wherein the fast frame image includes a plurality of target-like features, each of the plurality of readout circuits further comprising
an integrator configured to perform a plurality of integrations based on the integration time to provide a plurality of subframes; and
an averager coupled to the integrator and configured to average a number of the plurality of the subframes to provide the fast frame image, the target being resolvable in the fast frame image;
a processor configured to
filter a plurality of image features to exclude a portion of the plurality of target-like features inconsistent with a plurality of target thresholds;
preprocess the plurality of target-like features to provide a plurality of continuous target-like features;
statistically analyze the plurality of continuous target-like features based on a geometry of each of the plurality of continuous target-like features; and
remove the plurality of continuous target-like features based on at least one of size, shape and distance to provide a plurality of target candidates; and
a memory coupled to the processor and configured to provide the processor with instructions.

13. The system of claim 12, wherein the integrator is configured to repeat the performing the plurality of integrations and the average is configured to repeat the averaging for a plurality of iterations to provide a plurality of fast frame images; and wherein the processor is further configured to:
repeat the filter, preprocess, statistically analyze and remove for the plurality of fast frame images to provide an additional plurality of target candidates for each of the plurality of fast frame images; and
compare the plurality of target candidates for the fast frame image and the additional plurality of target candidates for the each of the plurality of fast frame images to identify a target signature based on distance between the plurality of target candidates and each of the additional plurality of target candidates.

14. A system, comprising:
a processor configured to
filter a plurality of image features in a fast frame image including a plurality of target-like features, the filter being configured to exclude a portion of the plurality of target-like features inconsistent with a plurality of target thresholds, the fast frame image being provided by a plurality of readout circuits having an integration time of not more than five hundred microseconds, the integration time being changeable and set based on a speed of a target desired to be captured in the fast frame image, the plurality of readout circuits configured to read a plurality of pixels in an image detector, the plurality of pixels having a pitch of less than ten micrometers, the integration time being not more than five hundred microseconds, the integration time corresponding to a subframe of the fast frame image, each of the plurality of readout circuits further includes an integrator and an averager, the integrator being configured to perform a plurality of integrations based on the integration time to provide a plurality of subframes, the averager being coupled to the integrator and configured to average a number of the plurality of the subframes to provide the fast frame image, the target being resolvable in the fast frame image;

preprocess the plurality of target-like features to provide a plurality of continuous target-like features;

statistically analyze the plurality of continuous target-like features based on a geometry of each of the plurality of continuous target-like features; and remove a portion of the plurality of continuous target-like features based on at least one of size, shape and distance to provide a plurality of target candidates; and a memory coupled to the processor and configured to provide the processor with instructions.

15. The system of claim 14, wherein the integration time is based on a dwell time of the target in a pixel of the plurality of pixels.

16. The system of claim 14, wherein the integrator includes an integration capacitor and the averager includes an averaging capacitor, the integration capacitor being coupled with a pixel of the plurality of pixels, the pixel having a pixel area, an available area less than the pixel area being usable for layout of the integration capacitor, the integration capacitor having a capacitor area less than the available area, the integration capacitor having an integration capacitance.

17. The system of claim 16, wherein the averaging capacitor has an averaging capacitance greater than the integration capacitance.

* * * * *